(12) United States Patent
Shimoda et al.

(10) Patent No.: US 10,769,831 B2
(45) Date of Patent: Sep. 8, 2020

(54) HEAD UP DISPLAY

(71) Applicant: MAXELL, LTD., Kyoto (JP)

(72) Inventors: Nozomu Shimoda, Kyoto (JP); Yuji Fujita, Kyoto (JP); Takeshi Arakawa, Kyoto (JP); Akio Misawa, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/315,662

(22) PCT Filed: Jul. 12, 2017

(86) PCT No.: PCT/JP2017/025374
§ 371 (c)(1),
(2) Date: Jan. 7, 2019

(87) PCT Pub. No.: WO2018/042898
PCT Pub. Date: Mar. 8, 2018

(65) Prior Publication Data
US 2019/0139286 A1  May 9, 2019

(30) Foreign Application Priority Data

Aug. 29, 2016  (JP) .................................. 2016-166723

(51) Int. Cl.
*G06T 11/60* (2006.01)
*B60K 35/00* (2006.01)
(Continued)

(52) U.S. Cl.
CPC .............. *G06T 11/60* (2013.01); *B60K 35/00* (2013.01); *G01C 21/36* (2013.01); *G02B 27/01* (2013.01);
(Continued)

(58) Field of Classification Search
None
See application file for complete search history.

(56) References Cited

U.S. PATENT DOCUMENTS 9,746,668 B2 * 8/2017 Kim ........................ H04N 5/247
9,823,471 B2 * 11/2017 Kim .................... G02B 27/0101
(Continued)

FOREIGN PATENT DOCUMENTS

| JP | 2006-007867 A | 1/2006 |
| JP | 2007-055365 A | 3/2007 |

(Continued)

OTHER PUBLICATIONS

International Search Report of PCT/JP2017/025374 dated Oct. 3, 2017.

*Primary Examiner* — Ryan M Gray
(74) *Attorney, Agent, or Firm* — Mattingly & Malur, PC

(57) ABSTRACT

A head up display superimposes a virtual image on an actual view in accordance with a traveling status of a vehicle. Vehicle information containing a lean of the vehicle in a pitch direction is detected by a first posture sensor, and a lean in a roll direction is detected by a second posture sensor. A controller controls display of video on the basis of the vehicle information. A mirror reflects the video to project the video to a windshield or combiner. A mirror driver changes an angle and/or a position of the mirror. At least one of a display state of the virtual image in a display area for the video or the angle and/or the position of the mirror via the mirror driver is adjusted by the controller on the basis of the lean in the pitch direction and/or the lean in the roll direction.

6 Claims, 29 Drawing Sheets

(51) Int. Cl.
  *G02B 27/01* (2006.01)
  *G01C 21/36* (2006.01)
  *G08G 1/0969* (2006.01)
  *G09G 3/00* (2006.01)

(52) U.S. Cl.
  CPC ..... *G02B 27/0101* (2013.01); *G02B 27/0179* (2013.01); *G08G 1/0969* (2013.01); *G09G 3/001* (2013.01); *B60K 2370/334* (2019.05); *B60K 2370/52* (2019.05); *G01C 21/365* (2013.01); *G02B 2027/014* (2013.01); *G02B 2027/0183* (2013.01); *G09G 2340/0464* (2013.01); *G09G 2340/12* (2013.01); *G09G 2380/10* (2013.01)

(56) References Cited

U.S. PATENT DOCUMENTS

| | | | |
|---|---|---|---|
| 10,322,672 B2* | 6/2019 | Watanabe | B60K 35/00 |
| 2007/0198183 A1 | 8/2007 | Morimoto et al. | |
| 2010/0164702 A1* | 7/2010 | Sasaki | G01B 21/22 340/438 |
| 2014/0211319 A1 | 7/2014 | Park et al. | |
| 2016/0202480 A1* | 7/2016 | Kuzuhara | G03B 21/28 345/7 |
| 2016/0216521 A1* | 7/2016 | Yachida | G01C 21/365 |
| 2017/0038595 A1* | 2/2017 | Kutomi | G02B 27/01 |
| 2018/0061129 A1* | 3/2018 | Sisbot | H04W 4/80 |
| 2018/0143431 A1* | 5/2018 | Matsuura | G02B 27/0101 |
| 2019/0227675 A1* | 7/2019 | Cramer | B60K 37/02 |

FOREIGN PATENT DOCUMENTS

| | | |
|---|---|---|
| JP | 2010-156608 A | 7/2010 |
| JP | 2013-237320 A | 11/2013 |
| JP | 2015-080988 A | 4/2015 |
| JP | 2015-202842 A | 11/2015 |
| JP | 2016-137736 A | 8/2016 |

* cited by examiner

FIG. 12
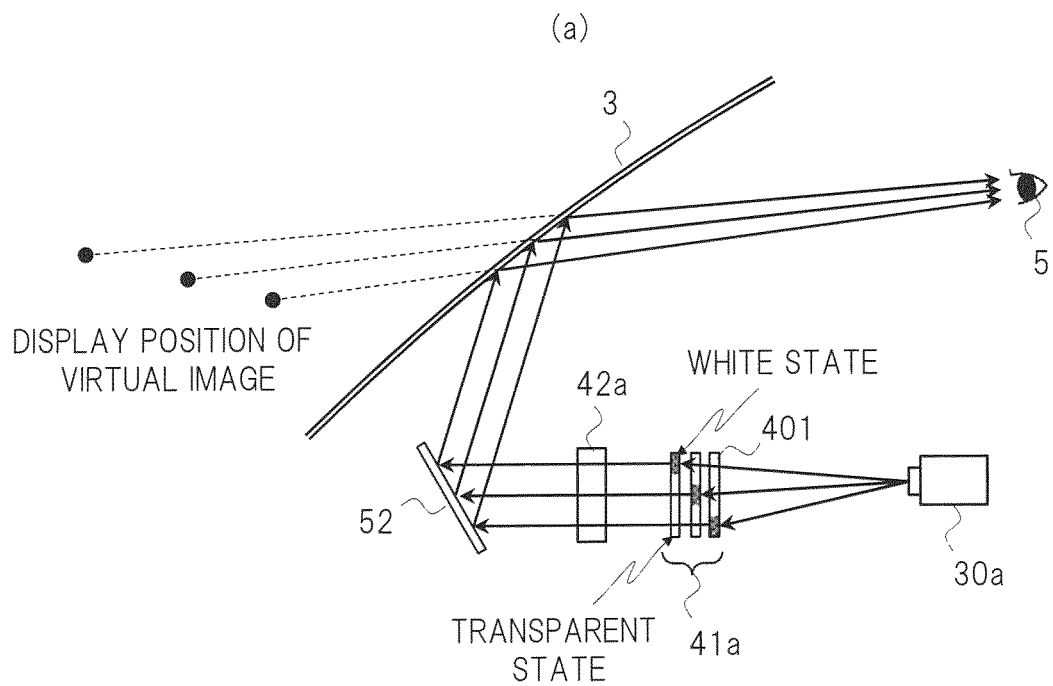
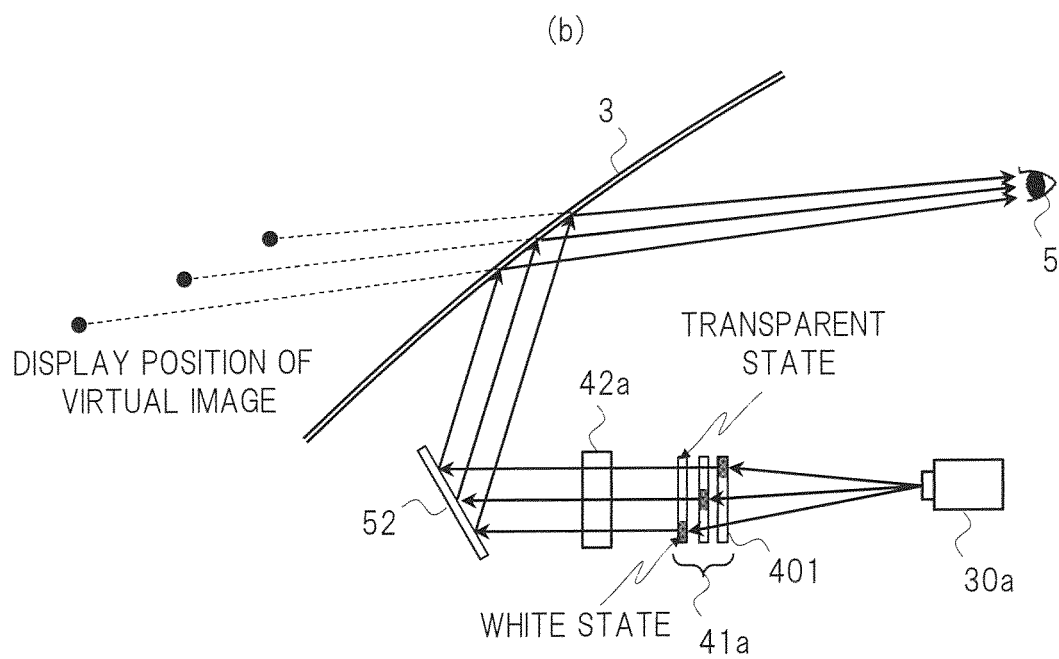

FIG. 16
(a)
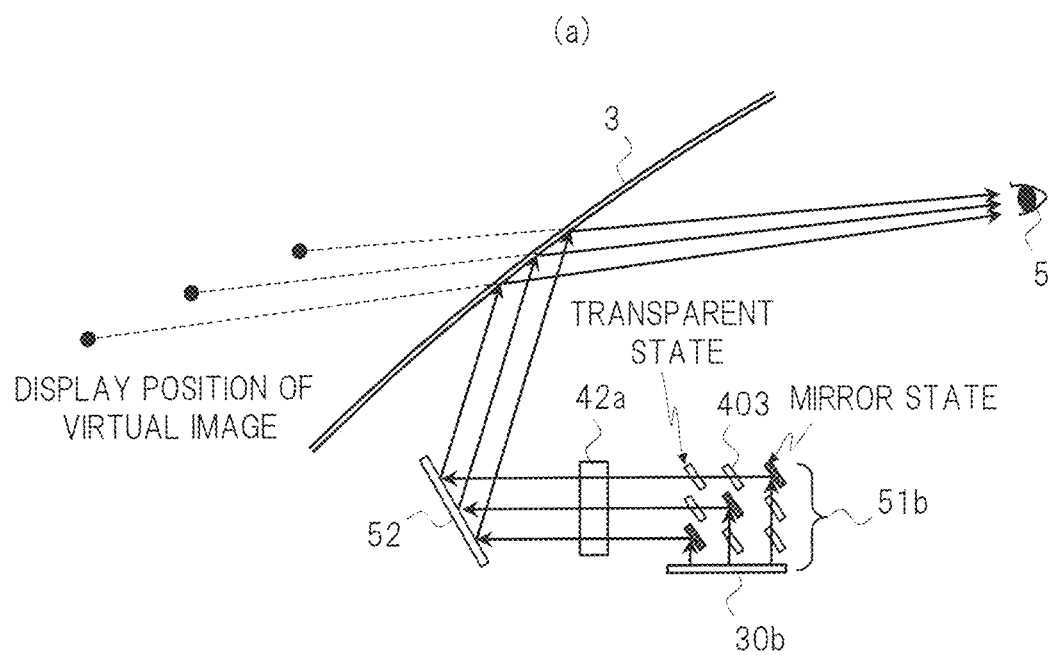
(b)
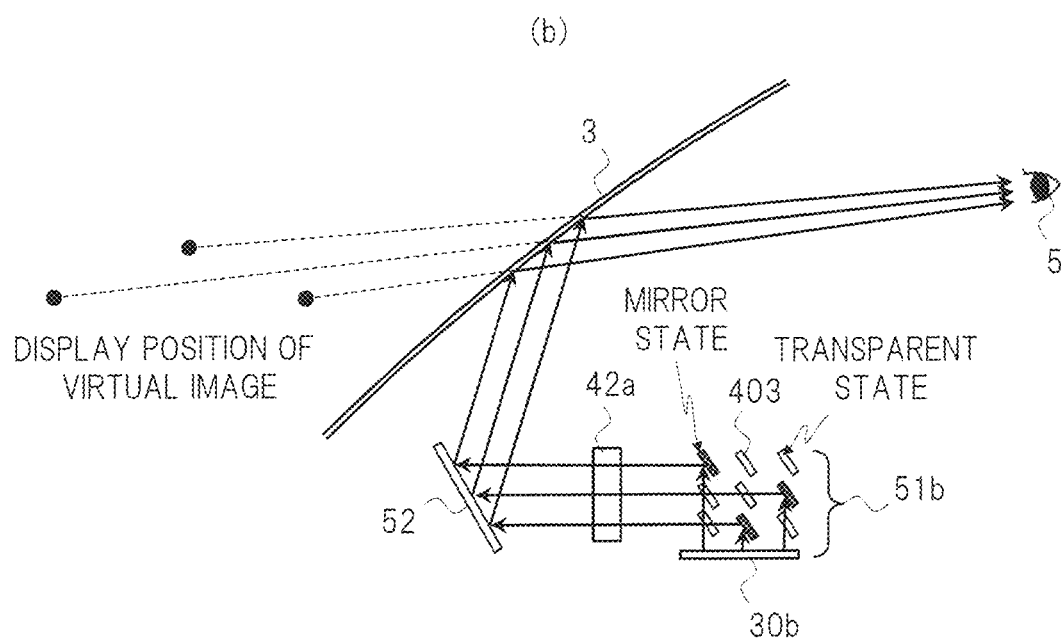

FIG. 19
(a)
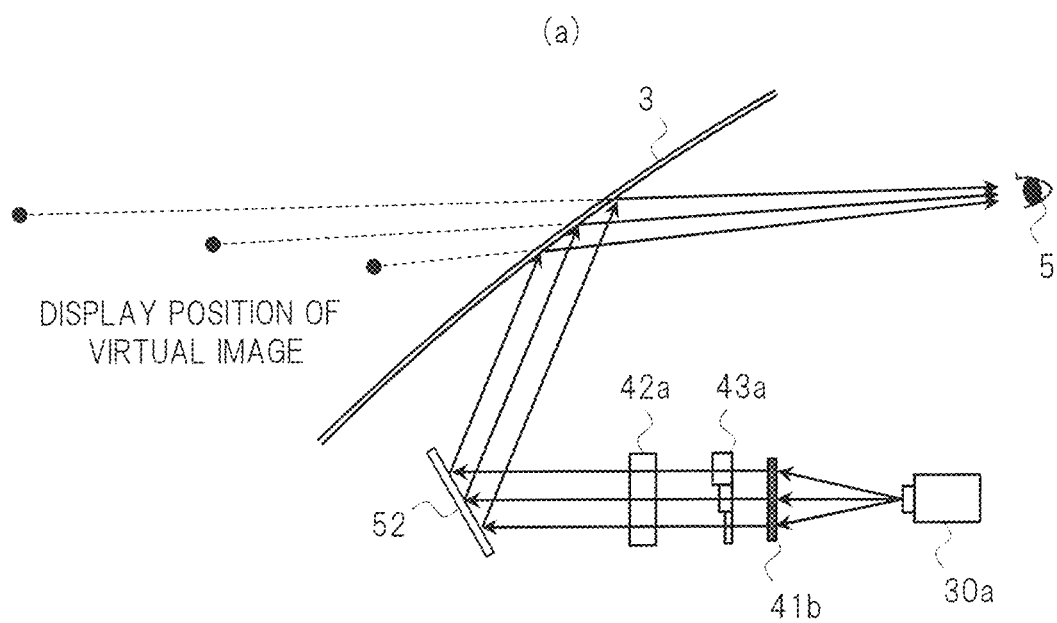
(b)
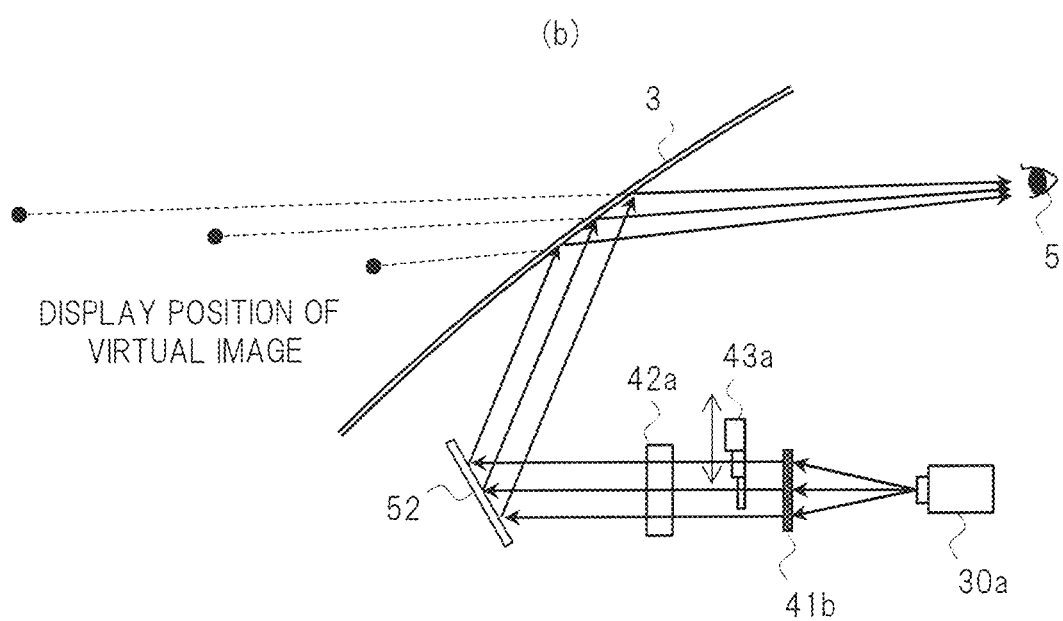

FIG. 24
(a)
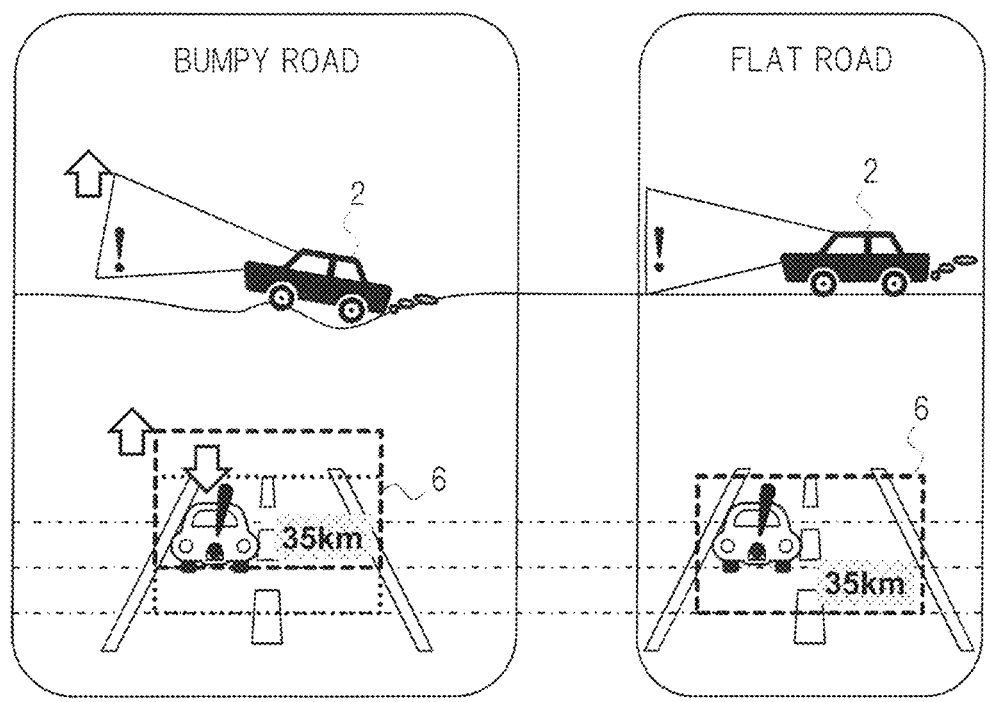
(b)
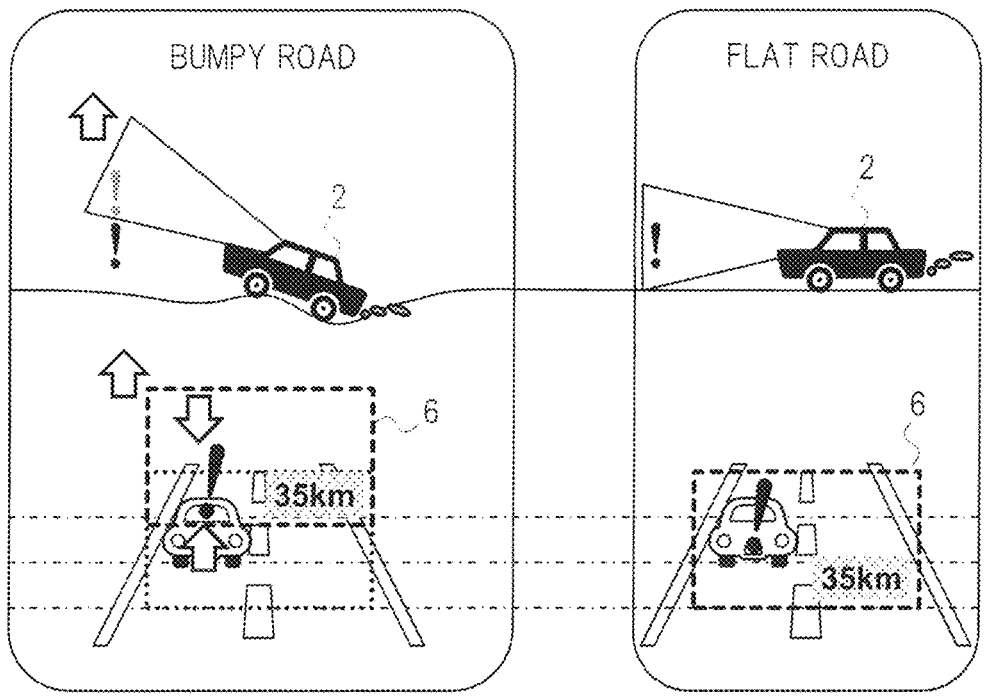

FIG. 25
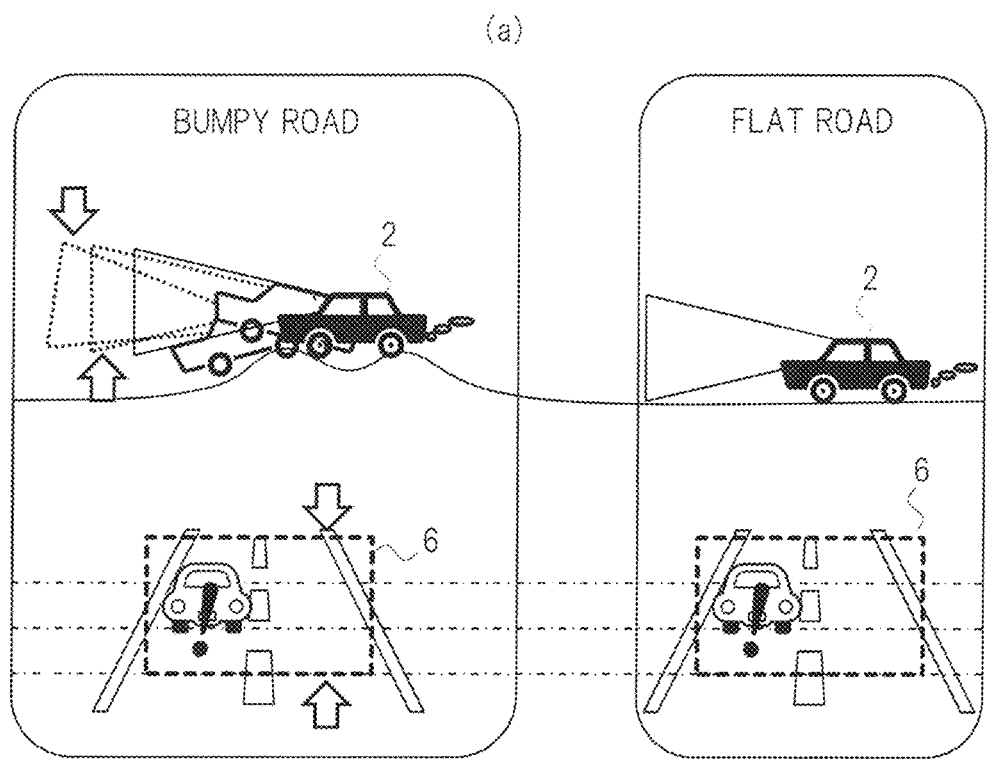
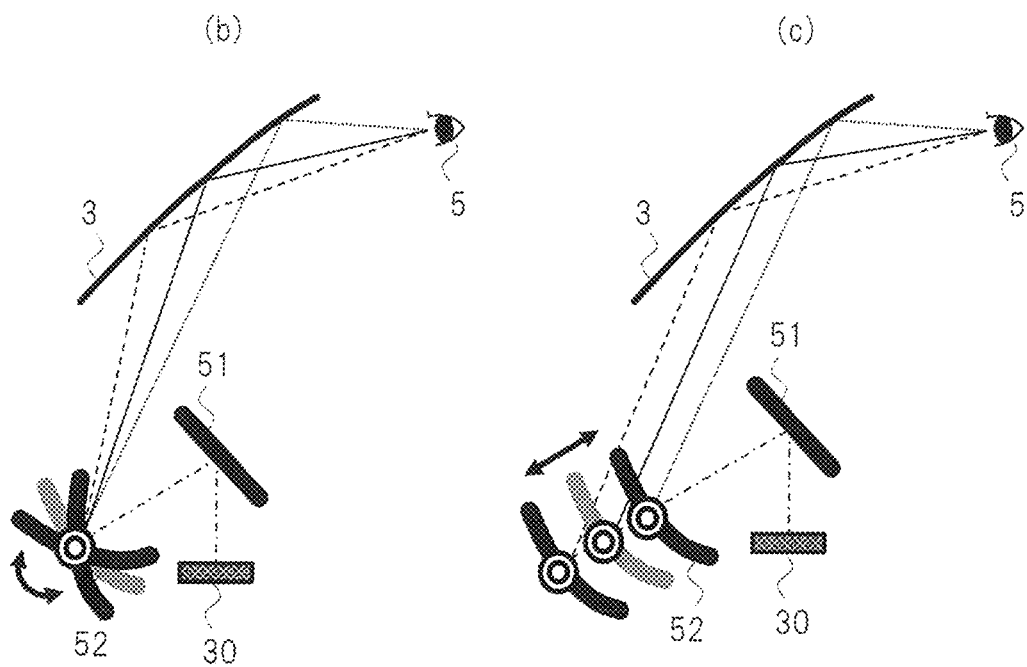

FIG. 26
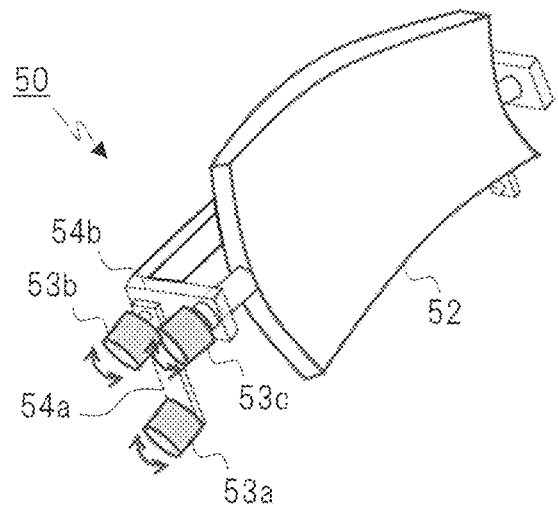
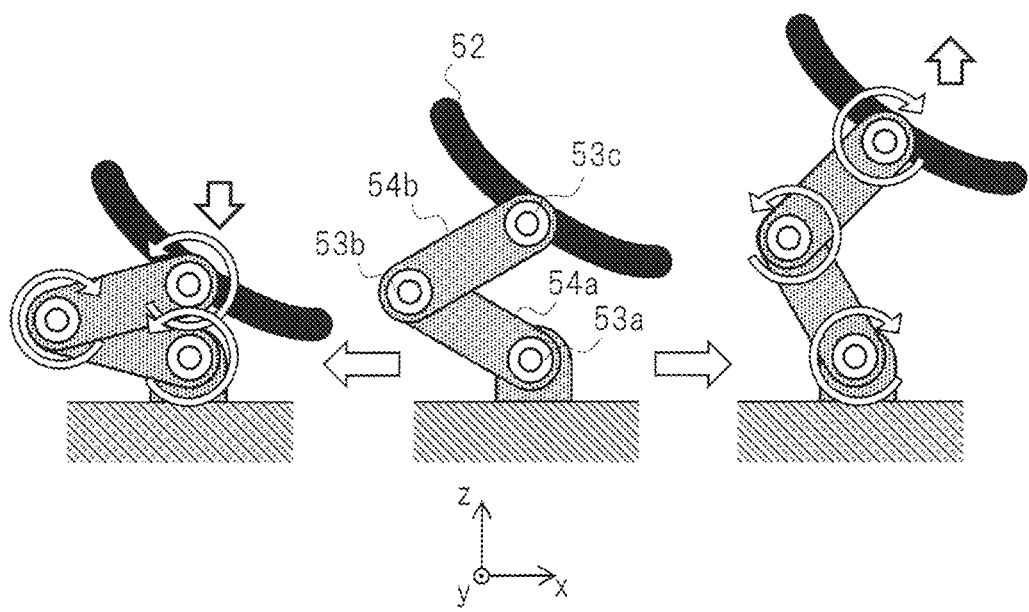

FIG. 27
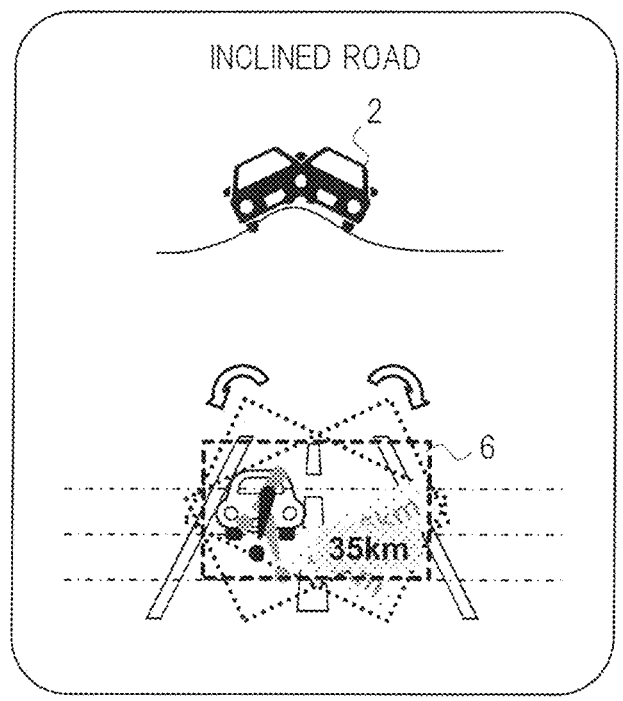
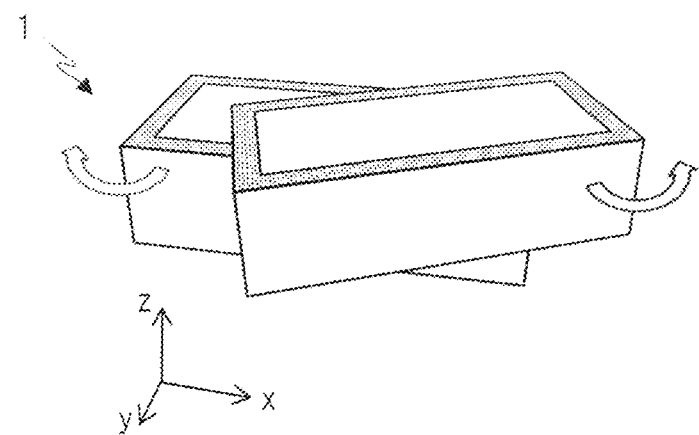

| ANGLE OF FIRST POSTURE SENSOR | MOVING AMOUNT OF DISPLAY OF VIRTUAL IMAGE | ANGLE OF SECOND POSTURE SENSOR | ROTATING AMOUNT OF DISPLAY OF VIRTUAL IMAGE |
|---|---|---|---|
| ... | ... | ... | ... |
| 15 | -6 | 15 | -15 |
| 10 | -6 | 10 | -10 |
| 5 | -3 | 5 | -5 |
| 0 | 0 | 0 | 0 |
| -5 | 3 | -5 | 5 |
| -10 | 6 | -10 | 10 |
| -15 | 6 | -15 | 15 |
| ... | ... | ... | ... |

FIG. 30
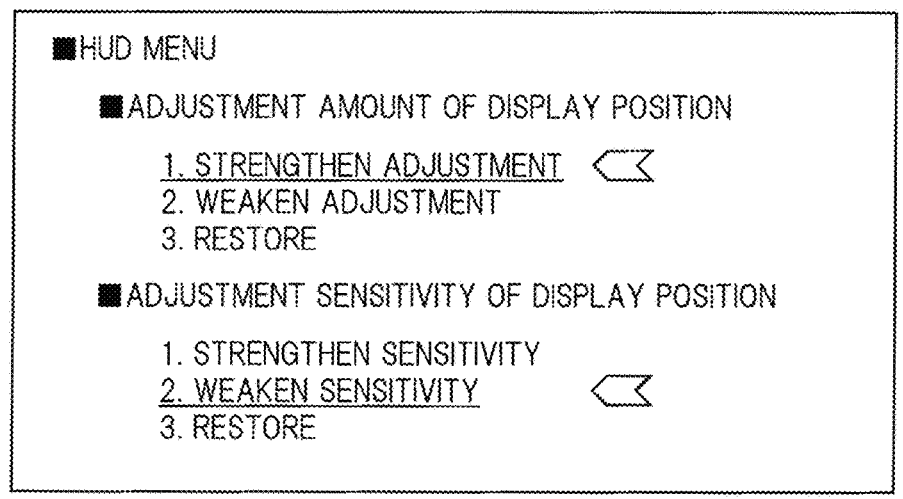
(a)
(b)
| ANGLE OF FIRST POSTURE SENSOR | MOVING AMOUNT OF DISPLAY OF VIRTUAL IMAGE |
|---|---|
| ... | ... |
| 7 | -3 |
| 5 | -2 |
| 3 | -1 |
| 0 | 0 |
| -3 | 1 |
| -5 | 2 |
| -7 | 3 |
| ... | ... |
(ORIGINAL SET VALUE)
| ANGLE OF FIRST POSTURE SENSOR | MOVING AMOUNT OF DISPLAY OF VIRTUAL IMAGE |
|---|---|
| ... | ... |
| 7 | -4 |
| 5 | -3 |
| 3 | -2 |
| 0 | 0 |
| -3 | 2 |
| -5 | 3 |
| -7 | 4 |
| ... | ... |
(SET VALUE TO STRENGTHEN ADJUSTMENT)

HEAD UP DISPLAY

TECHNICAL FIELD

The present invention relates to a technique of a head up display, and particularly, the present invention relates to an effective technique for application to a head up display using AR (Augmented Reality).

BACKGROUND ART

For example, in a vehicle such as an automobile, information such as vehicle speed or the number of revolutions of an engine is normally displayed on an instrument panel board (or an instrument panel) in a dashboard. Further, a screen for car navigation or the like is displayed on a display that is built in the dashboard or mounted on the dashboard. In a case where a driver visually recognizes these kinds of information, there is need to largely move a visual line. Therefore, as a technique to reduce a moving amount of the visual line, a head up display (Head Up Display: hereinafter, referred to also as "HUD") is known that projects information such as vehicle speed or information such as an instruction related to car navigation onto a windshield or a combiner and displays the information.

An in-vehicle display apparatus including the HUD, a vehicle may vibrate or be inclined in accordance with a traveling status. Therefore, a case where a problem occurs on visibility of video to be displayed, and a case where appropriate content cannot be displayed may be generated.

As a technique related to improvement and the like of the visibility of the video to be displayed in the HUD, for example, Japanese Patent Application Publication No. 2013-237320 (Patent document 1) describes that a rotational component generated on a vehicle body is acquired as a lean of the vehicle body, video is rotatively corrected three-dimensionally on the basis of this, a position and the lean for displaying the rotatively corrected video are determined, and the video is projectively displayed.

Further, Japanese Patent Application Publication No. 2007-55365 (Patent document 2) describes that when a distance scale is displayed on an HUD, information on a traveling spot at which own vehicle is currently traveling and information on a traveling preset spot toward which the own vehicle is traveling are acquired from map data of a navigation apparatus, and an angle of gradient of a road on which the own vehicle is traveling is acquired on the basis of this, a display height from the ground of the distance scale is corrected and displayed by using a correction coefficient based on the angle of gradient.

Further, Japanese Patent Application Publication No. 2006-7867 (Patent document 3) describes that a display position of generated video is controlled in accordance with a detected traveling status such as right or left turning, acceleration or deceleration. For example, in a case where left turning is detected, the display position is shifted to a left direction. In a case where right turning is detected, the display position is shifted to a right direction.

Further, Japanese Patent Application Publication No. 2015-202842 (Patent document 4) describes that a display position of video information is moved toward a direction in which a field of view of a driver is secured in accordance with a vehicle state.

RELATED ART DOCUMENTS

Patent Documents

Patent document 1: Japanese Patent Application Publication No. 2013-237320
Patent Document 2: Japanese Patent Application Publication No. 2007-55365
Patent document 3: Japanese Patent Application Publication No. 2006-7867
Patent Document 4: Japanese Patent Application Publication No. 2015-202842

SUMMARY OF THE INVENTION

Problems to be Solved by the Invention

The HUD is an apparatus that projects video onto a windshield or a combiner, whereby a driver is caused to recognize the video as a virtual image in vehicle exterior. On the other hand, an HUD that realizes a so-called AR function (hereinafter, referred to also as "AR-HUD"), in which information related to an object and the like can be indicated to the driver by displaying the virtual image so as to superimpose the virtual image onto an actual scene (actual view) of the vehicle exterior seen through the windshield or the combiner, is known. In such an AR-HUD, there is also need to execute adjustment for maintaining the visibility of the video to be displayed, suitability, or the like in accordance with a traveling status of the vehicle.

In this point, for example, by using the technique as described in any of above Patent documents 1 to 3, even in a case where the vehicle vibrates or is inclined in accordance with the traveling status, it is possible to reduce or solve an influence on visibility or suitability of the video to be displayed (virtual image). On the other hand, in these techniques, by using the video displayed in the display area for the virtual image in the HUD as a target, the display position, the display content or the like is adjusted in accordance with the traveling status. However, in case of the HUD, by taking into consideration the fact that an effect to reduce a moving amount of the visual line of the driver can be acquired regardless of the traveling status of the vehicle, it is desirable to execute not only adjustment of the video in the display area, but also adjustment of the display area itself to move a position thereof.

In this point, in the technique described in Patent document 4, the display area itself in the HUD can be moved in accordance with the vehicle state. However, the technique described in Patent document 4 is intended to secure the field of view of the driver even in a case where a change occurs in the vehicle state. The display area in the HUD is moved to a position at which the display area does not constitute an obstacle for the driver. When such a technique is applied to the AR-HUD, a case where the virtual image cannot be superimposed onto the actual view included in the field of view of the driver occurs. Thus, the AR function does not have effectiveness.

Thus, it is an object of the present invention to provide a head up display capable of displaying a virtual image in accordance with a traveling status of a vehicle so as to appropriately superimpose the virtual image onto an actual view.

The foregoing and other objects, and new features of the present invention will become more apparent from the detailed description of the present specification and the appending drawings.

Means for Solving the Problem

An outline of representative invention of the present invention disclosed in the present application will briefly be explained as follows.

A head up display according to a representative embodiment of the present invention is a head up display for a vehicle, including: a vehicle information acquiring unit configured to acquire vehicle information containing a lean of the vehicle in a front-back direction (pitch direction), which is detected by a first posture sensor, and a lean in a horizontal direction (roll direction), which is detected by a second posture sensor, the first and second posture sensors being mounted on the vehicle; a controller configured to control display of video on a basis of the vehicle information acquired by the vehicle information acquiring unit; a video display configured to form the video on a basis of an instruction from the controller; a mirror configured to reflect the video formed by the video display to project the video to a windshield or combiner; and a mirror driver configured to change an angle and/or a position of the mirror on a basis of an instruction from the controller.

Further, the controller is configured to adjust at least one of a display state of a virtual image in a display area for the video or the angle and/or the position of the mirror via the mirror driver on a basis of the lean in the front-back direction (pitch direction) and/or the lean in the horizontal direction (roll direction) in the vehicle information so that the virtual image is superimposed onto a scene and the virtual image can be displayed to a driver.

Effects of the Invention

Effects obtained by representative invention of the present invention disclosed in the present application will briefly be explained as follows.

Namely, according to the representative embodiment of the present invention, it becomes possible to display a virtual image in an AR-HUD in accordance with a traveling status of a vehicle so as to appropriately superimpose the virtual image onto an actual view.

BRIEF DESCRIPTIONS OF THE DRAWINGS

Figure 13:
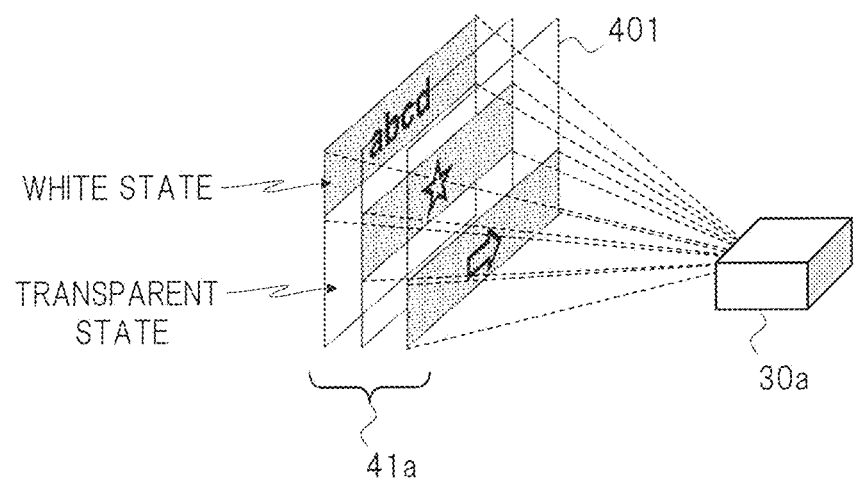
Figure 14:
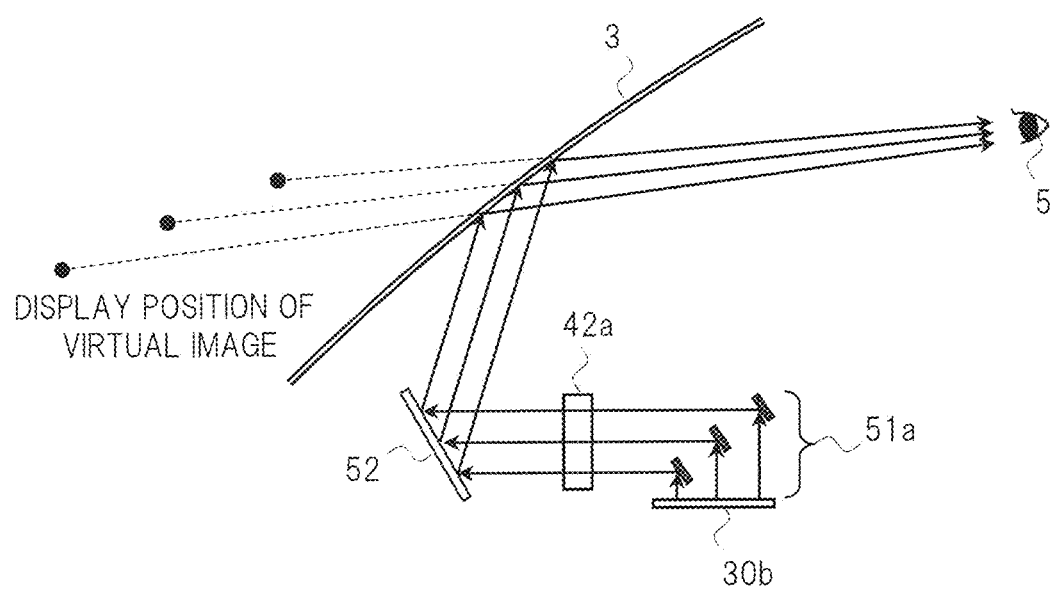
Figure 15:
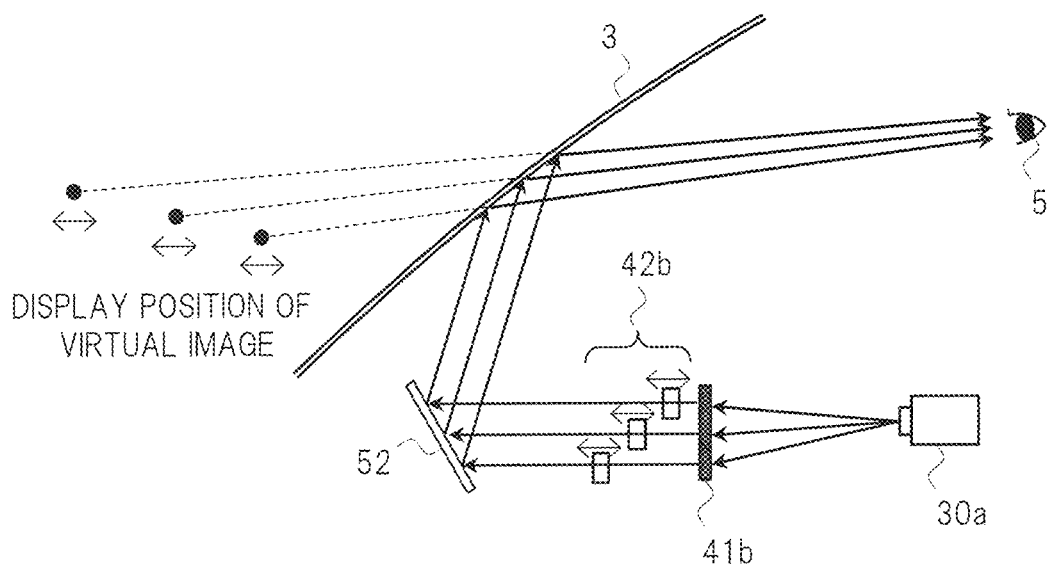
Figure 17:
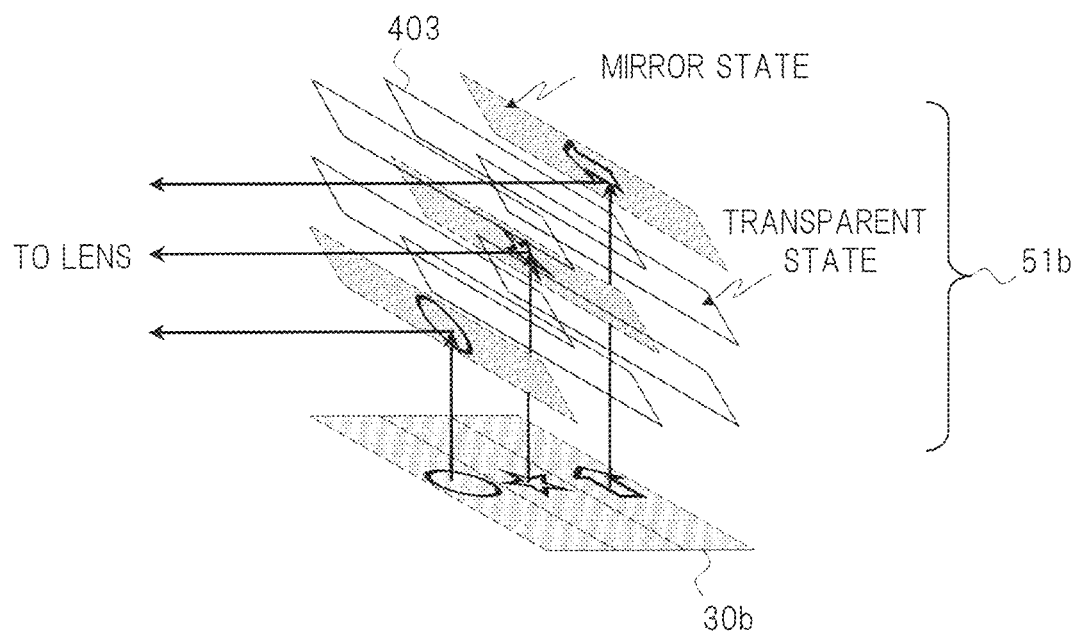
Figure 18:
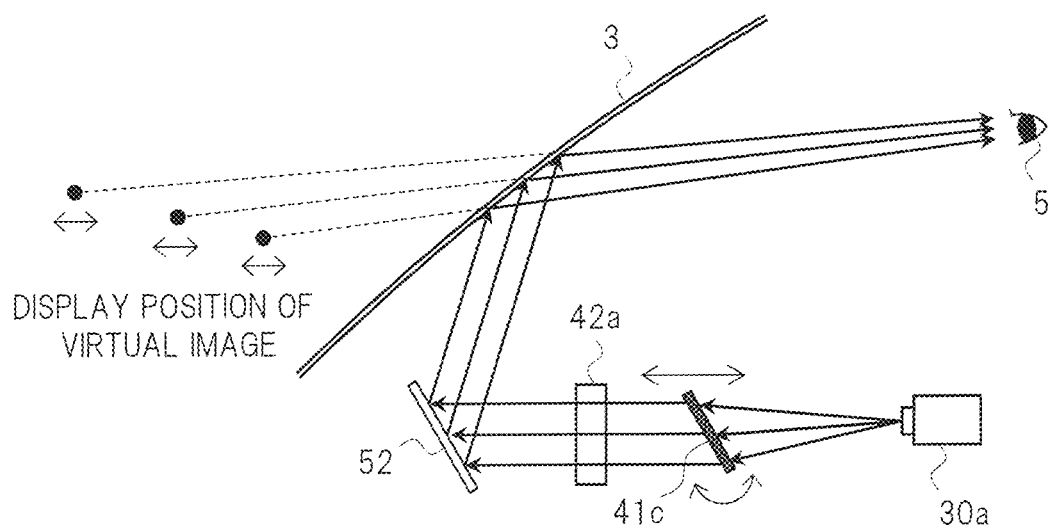
Figure 20:
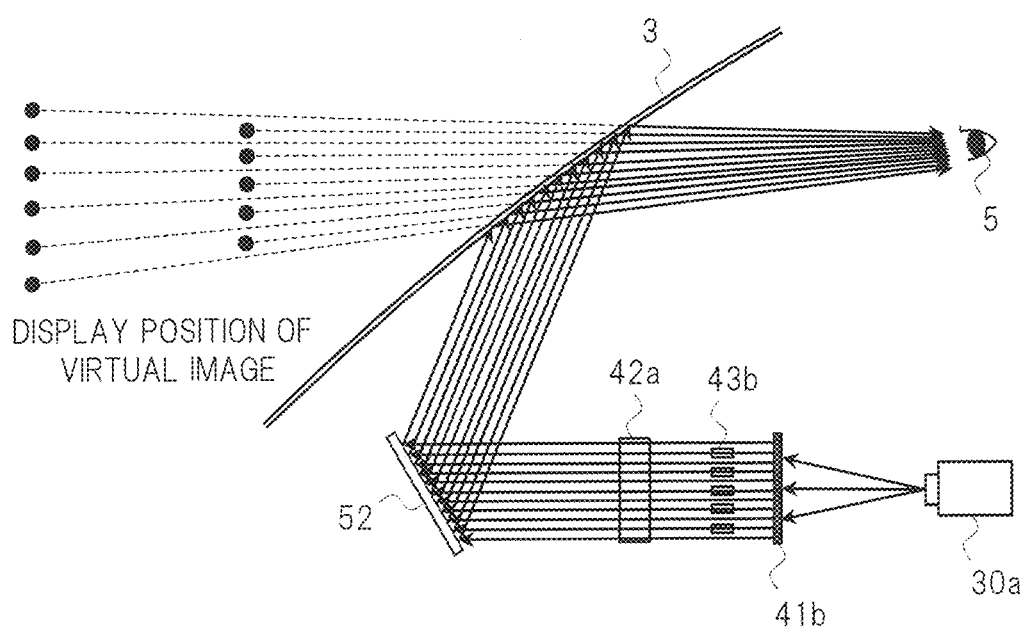
Figure 21:
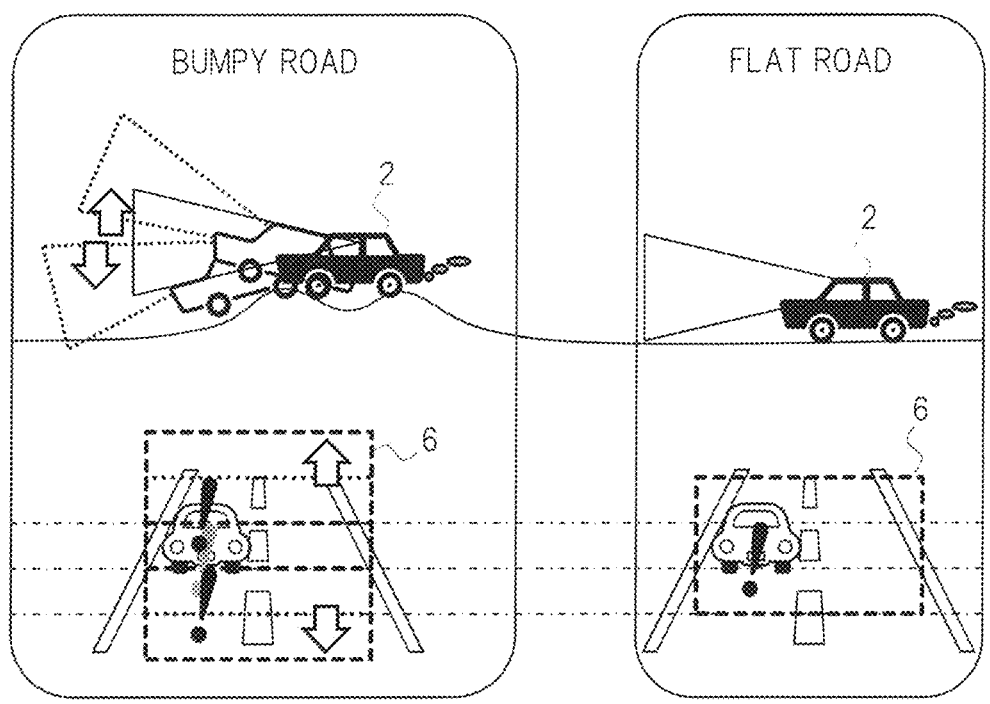
Figure 22:
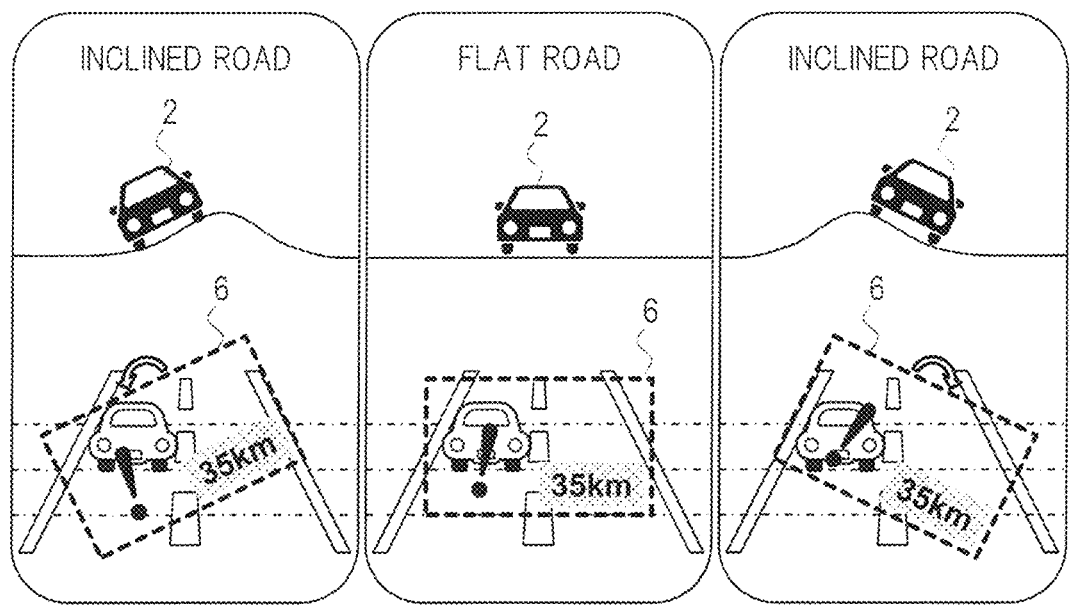
Figure 23:
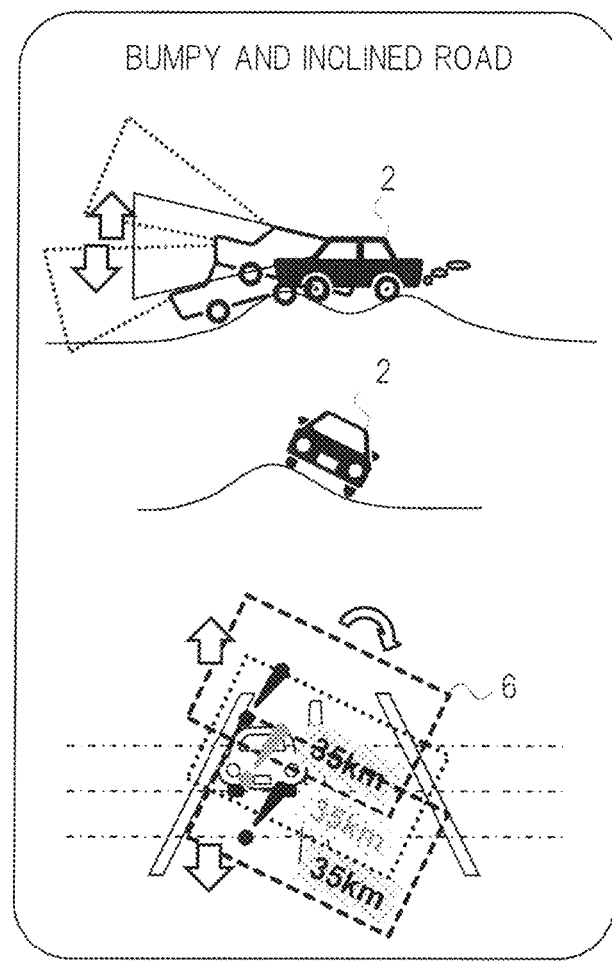
Figures 28, 29:
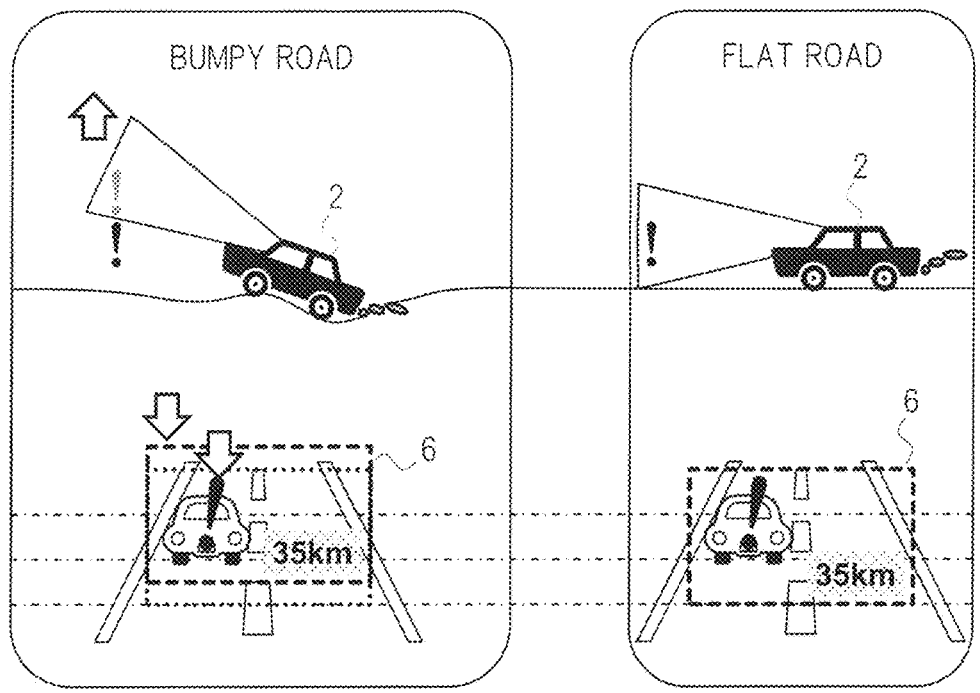
Figure 31:
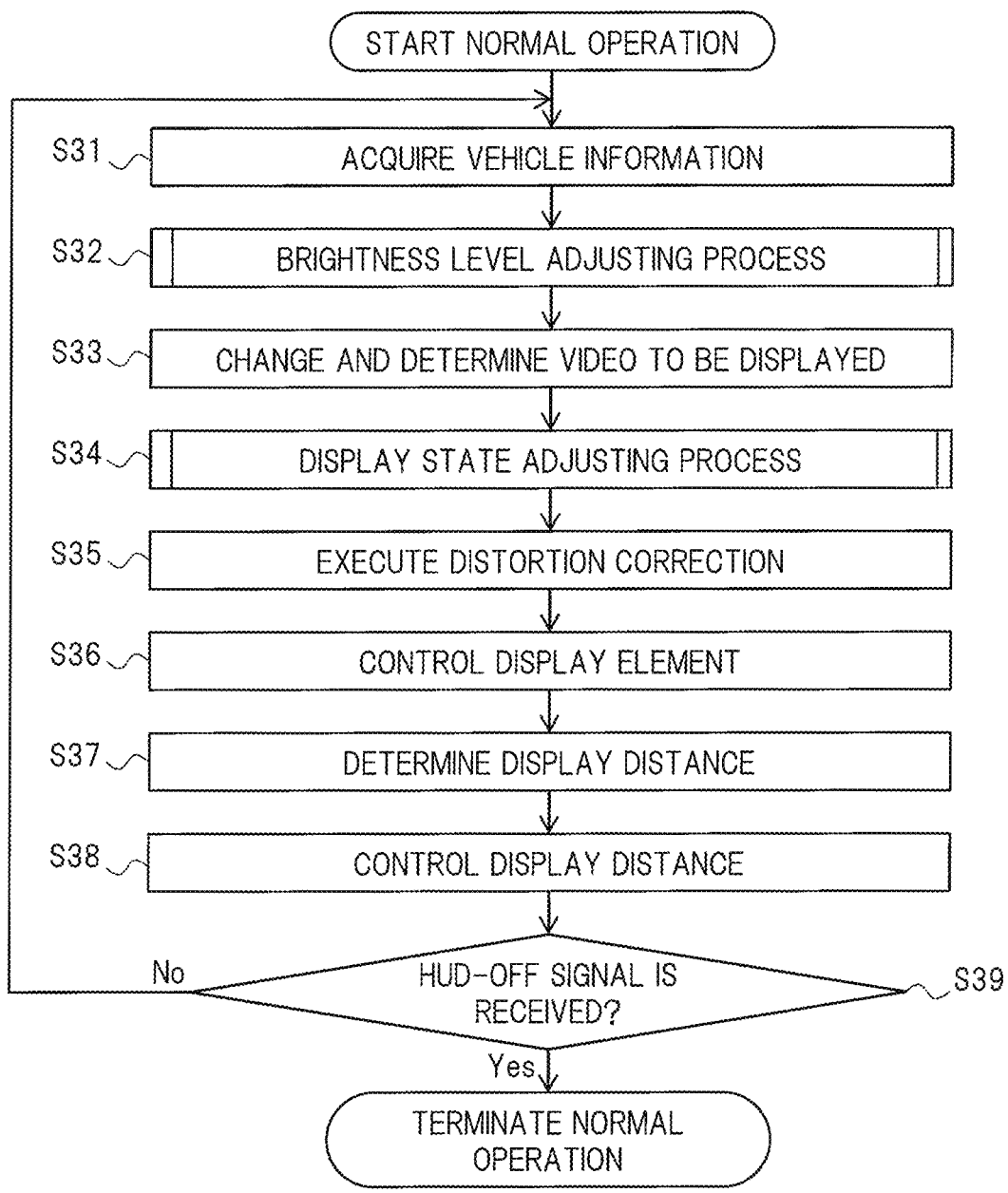
Figure 32:
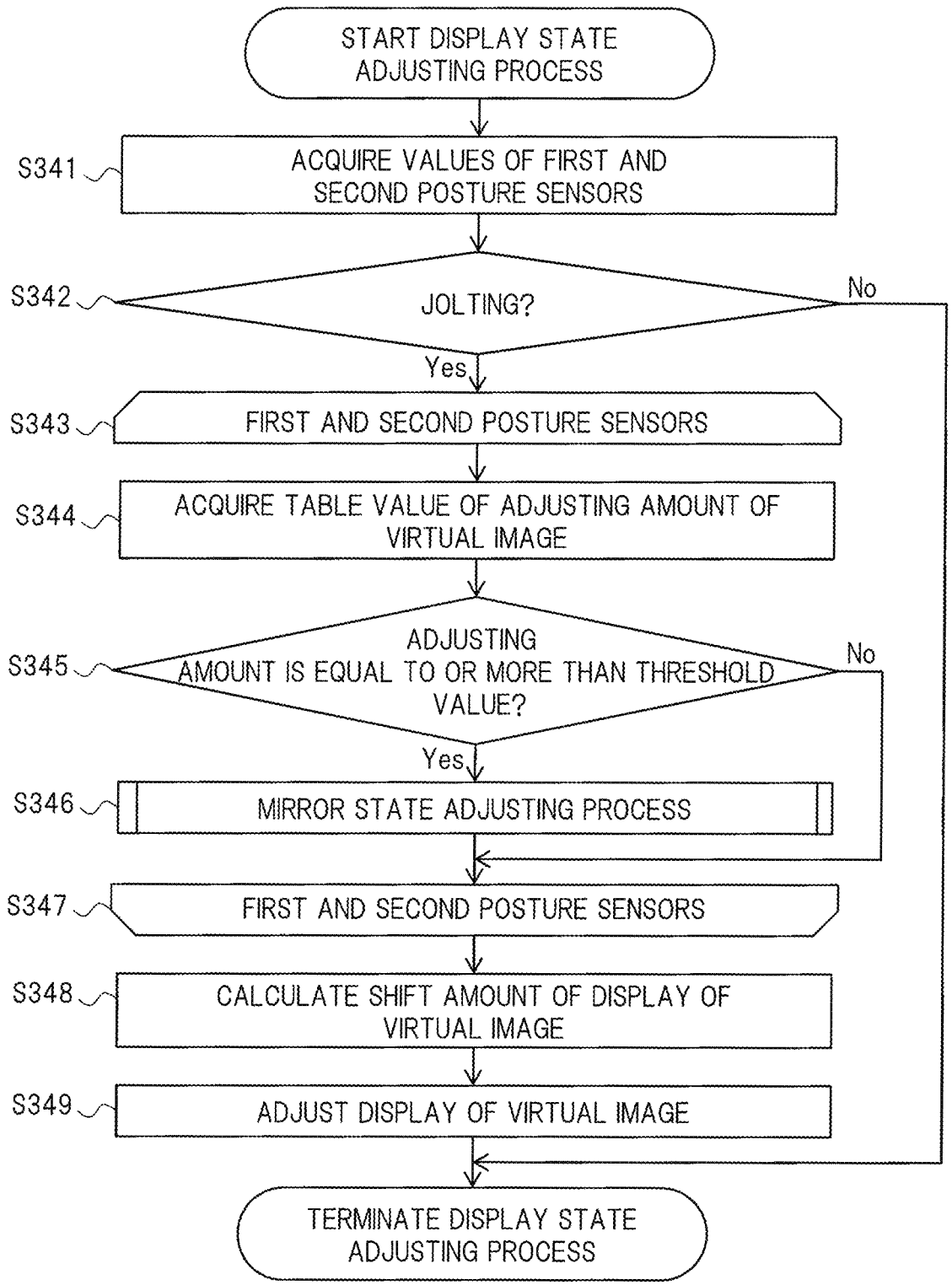
Figure 33:
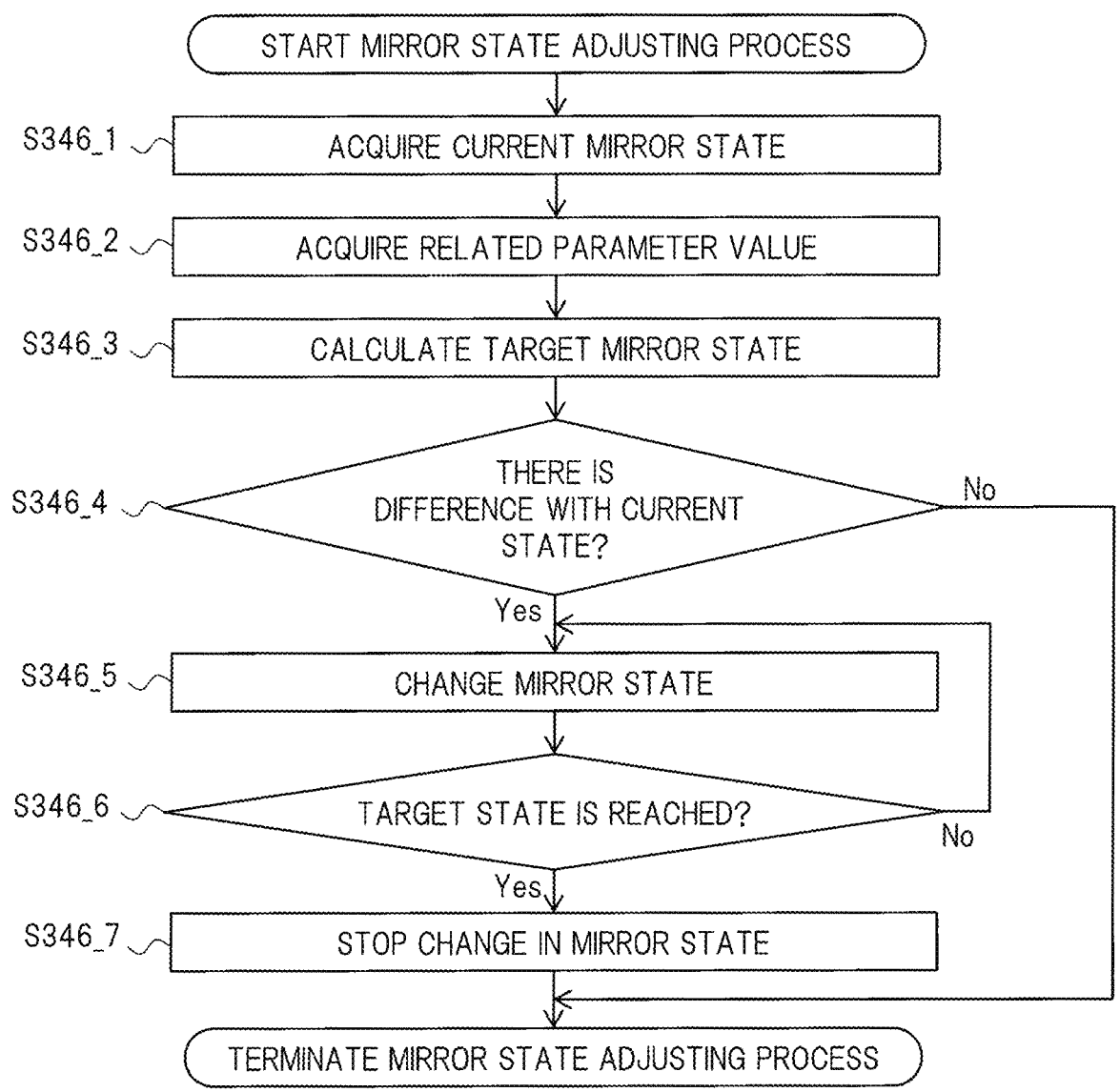

FIGS. 12(a) and 12(b) are views each illustrating an outline of an example of adjustment of the display distance by using functional liquid crystal films according to the first embodiment of the present invention;

FIG. 13 is a view illustrating an outline of a configuration example of a diffuser plate composed of the functional liquid crystal films according to the first embodiment of the present invention;

FIG. 14 is a view illustrating an outline of an example of the adjustment of the display distance by using a plurality of mirrors according to the first embodiment of the present invention;

FIG. 15 is a view illustrating an outline of an example of the adjustment of the display distance by using movable lenses according to the first embodiment of the present invention;

FIGS. 16(a) and 16(b) are views each illustrating an outline of an example of the adjustment of the display distance by using photochromic mirrors according to the first embodiment of the present invention;

FIG. 17 is a view illustrating an outline of a configuration example of the photochromic mirrors according to the first embodiment of the present invention;

FIG. 18 is a view illustrating an outline of an example of the adjustment of the display distance by using a movable diffuser plate according to the first embodiment of the present invention;

FIGS. 19(a) and 19(b) are views each illustrating an outline of an example of the adjustment of the display distance by using a movable optical filter according to the first embodiment of the present invention;

FIG. 20 is a view illustrating an outline of an example of the adjustment of the display distance by using a comb-shaped optical filter according to the first embodiment of the present invention;

FIG. 21 is a view illustrating an outline of an example of jolting of a vehicle and an example of a display state of a virtual image in a normal head up display;

FIG. 22 is a view illustrating an outline of an example of the jolting of the vehicle and an example of the display state of the virtual image in the normal head up display;

FIG. 23 is a view illustrating an outline of an example of the jolting of the vehicle and an example of the display state of the virtual image in the normal head up display;

FIGS. 24(a) and 24(b) are views each illustrating an outline of an example in which a display position of a virtual image is adjusted up and down according to a second embodiment of the present invention;

FIGS. 25(a) to 25(c) are views each illustrating an outline of an example in which the display position of the virtual image is adjusted up and down according to the second embodiment of the present invention;

FIGS. 26(a) and 26(b) are views each illustrating an outline of a configuration example of a mirror and a mirror driver according to the second embodiment of the present invention;

FIGS. 27(a) and 27(b) are views each illustrating an outline of an example in which right and left leans of a display area for the virtual image is adjusted according to the second embodiment of the present invention;

FIG. 28 is a view illustrating an outline of an example in which the virtual image and a display position of the display area are adjusted up and down according to the second embodiment of the present invention;

FIG. 29 is a view illustrating an outline of an example of a virtual image adjusting amount table according to the second embodiment of the present invention;

FIGS. 30(a) and 30(b) are views each illustrating an outline of an example in which a degree or sensitivity of adjustment of a display state of the virtual image is allowed to be set according to the second embodiment of the present invention;

FIG. 31 is a flowchart illustrating an outline of an example of a normal operation according to the second embodiment of the present invention;

FIG. 32 is a flowchart illustrating an outline of an example of a display state adjusting process according to the second embodiment of the present invention; and FIG. 33 is a flowchart illustrating an outline of an example of a mirror state adjusting process according to the second embodiment of the present invention.

DETAILED DESCRIPTION OF PREFERRED EMBODIMENTS

Hereinafter, embodiments of the present invention will be described in detail with reference to the drawings. Note that the same reference numeral is generally applied to the same element in all of the drawings for explaining the embodiments and its repeated explanation will be omitted. On the other hand, an element (or component) that has been explained in a drawing while applying a reference numeral thereto is not illustrated again when another drawing is to be explained, but the element may be referred to by applying the same reference numeral thereto.

Note that in the following explanation, with respect to motion directions of a vehicle, an axis of a direction in which the vehicle goes straight ahead may be described as a rolling axis and a direction in which the vehicle rotates around the rolling axis may be described as a roll direction. Further, an axis that belongs to the same horizontal plane as the rolling axis and crosses at right angles with the rolling axis may be described as a pitching axis, and a direction in which the vehicle rotates around the pitching axis may be described as a pitch direction. Further, an axis that belongs to the same vertical plane as the rolling axis and crosses at right angles with the rolling axis may be described as a yawing axis, and a direction in which the vehicle rotates around the yawing axis may be described as a yaw direction.

First Embodiment

<Apparatus Configuration>

Figure 2:
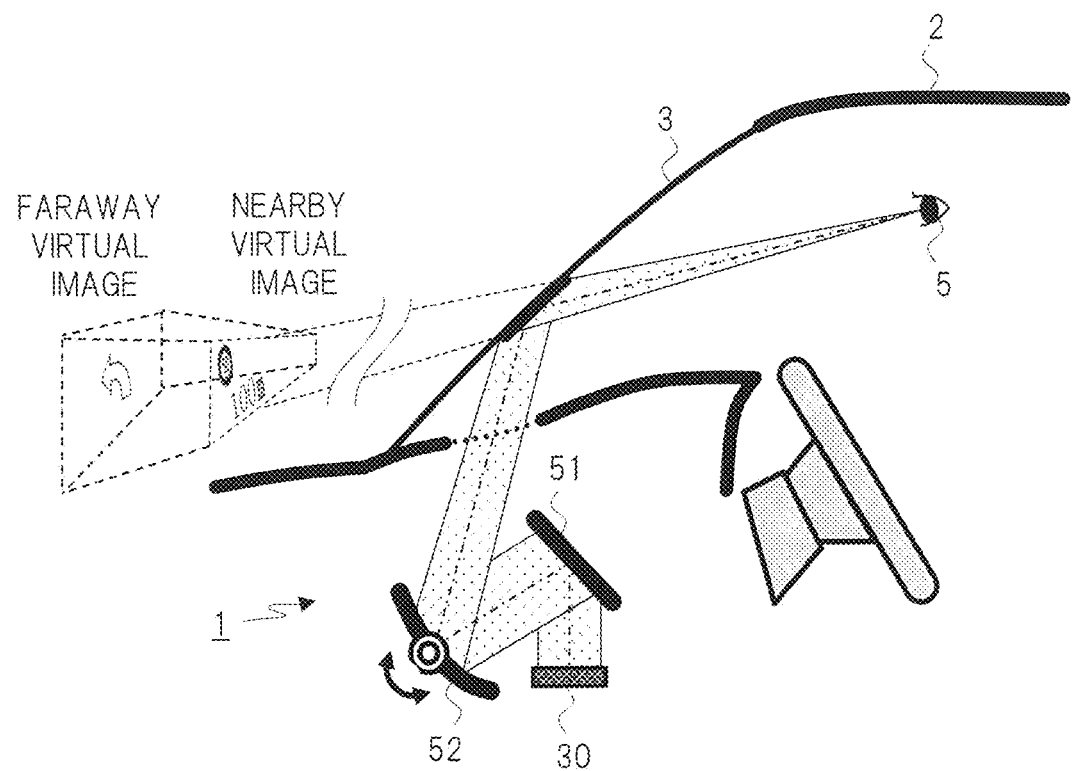
FIG. 2 is a view illustrating an outline of an example of an operation concept of the head up display according to the first embodiment of the present invention.

FIG. 2 is a view illustrating an outline of an example of an operation concept of the head up display according to a first embodiment of the present invention. An AR-HUD 1 according to the present embodiment causes a mirror 51 or a mirror 52 (for example, a free-form surface mirror, a mirror having an asymmetric shape with respect to an optical axis, or the like) to reflect video displayed on a video display 30 to project the video onto a windshield 3 of a vehicle 2. The video display 30 is constructed by a projector or an LCD (Liquid Crystal Display).

A driver 5 views video projected onto the windshield 3, thereby visually recognizing the video through the transparent windshield 3 in front thereof as a virtual image. In the present embodiment, by adjusting an angle of the mirror 52 as will be described later, a position of the windshield 3 at which video is to be projected is adjusted, whereby it is possible to adjust a display position of the virtual image viewed by the driver 5 in a vertical direction. Namely, the mirror 52 allows an angle to be adjusted by being rotated around a rotation axis of a horizontal direction.

Further, in the present embodiment, by using various kinds of methods (will be described later), a display distance of the virtual image can be adjusted so that the virtual image is displayed at a nearby position (for example, 2 to 3 m ahead) or a faraway position (for example, 30 to 40 m ahead). Then, by adjusting the display position and/or the display distance of the virtual image so as to superimpose the virtual image onto an actual view of vehicle exterior (a road, a building, a person or the like), an AR function is realized.

Figure 1:
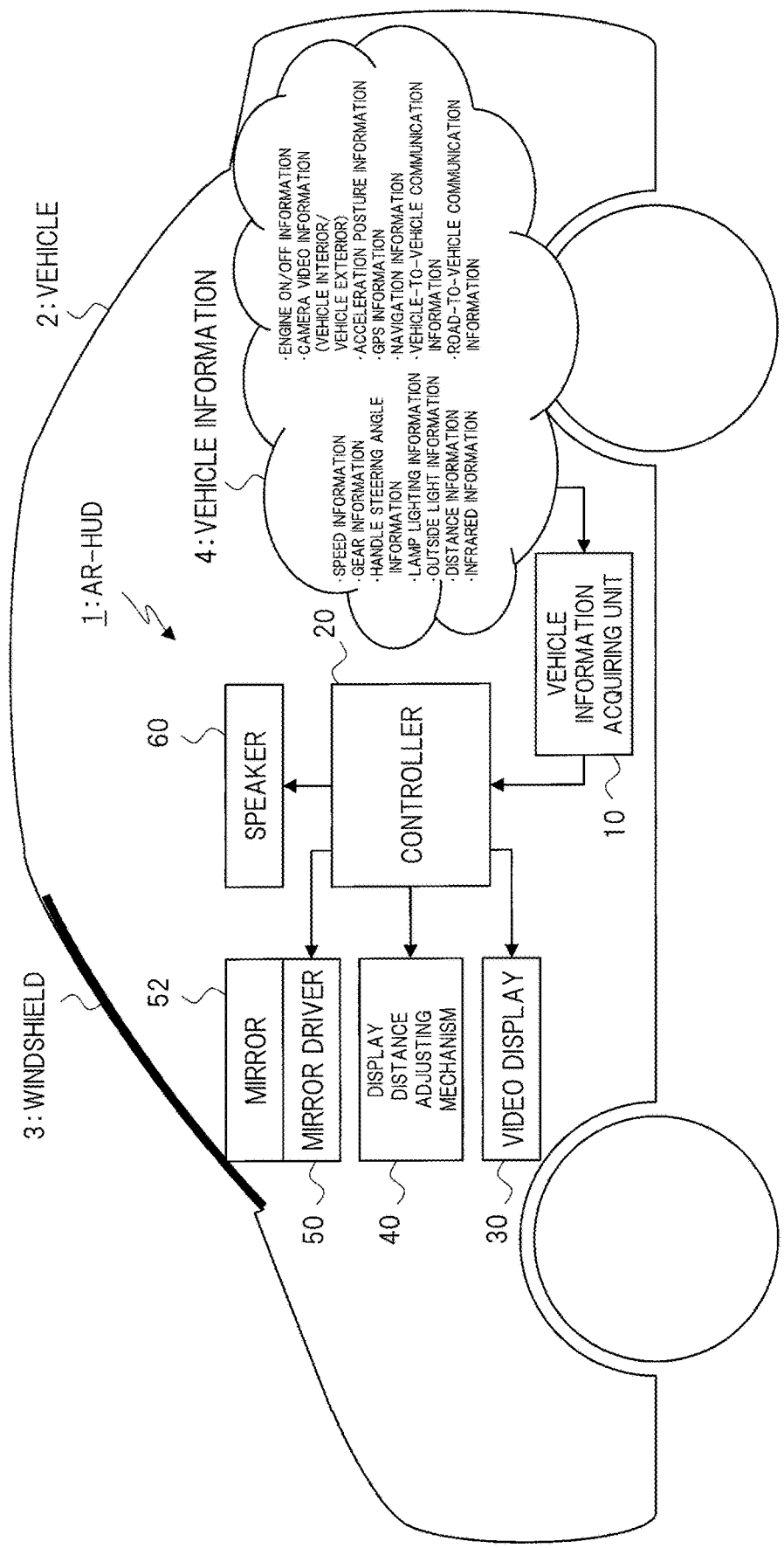
FIG. 1 is a functional block diagram illustrating an outline of a configuration example of the whole head up display according to a first embodiment of the present invention.

FIG. 1 is a functional block diagram illustrating an outline of a configuration example of the whole head up display according to the first embodiment of the present invention. The AR-HUD 1 mounted on the vehicle 2 includes a vehicle information acquiring unit 10, a controller 20, a video display 30, a display distance adjusting mechanism 40, a mirror driver 50, the mirror 52, and a speaker 60, for example. In the example of FIG. 1, a shape of the vehicle 2 is displayed like a passenger vehicle. However, the vehicle 2 is not limited to this, and the AR-HUD 1 can be applied to various kinds of vehicles appropriately.

The vehicle information acquiring unit 10 is composed of information acquiring devices such as various kinds of sensors mounted on respective portions of the vehicle 2 as will be described later. The information acquiring devices detect various kinds of events that occur in the vehicle 2, and detect and/or acquire values of various kinds of parameters related to a traveling status at predetermined intervals, thereby acquiring and outputting vehicle information 4. For example, as illustrated in FIG. 1, speed information and gear information of the vehicle 2, handle steering angle information, lamp lighting information, outside light information, distance information, infrared information, engine ON/OFF information, camera video information (vehicle interior/vehicle exterior), acceleration/posture information, GPS (Global Positioning System) information, navigation information, vehicle-to-vehicle communication information, road-to-vehicle communication information, and the like may be contained in the vehicle information 4.

The controller 20 has a function configured to control an operation of the AR-HUD 1. For example, a CPU (Central Processing Unit) and software to be executed by the CPU are implemented in the controller 20. The controller 20 may be configured by hardware such as a microcomputer or an FPGA (Field Programmable Gate Array). As also illustrated in FIG. 2, the controller 20 drives the video display 30 to form video to be displayed as a virtual image on the basis of the vehicle information 4 acquired by the vehicle information acquiring unit 10 and the like. The controller 20 causes the video to be reflected appropriately by means of the mirror 52 or the like, thereby projecting the video onto the windshield 3. Further, by methods as will be described later, the controller 20 executes controls to adjust a display position of a display area for the virtual image, and adjust the display distance of the virtual image.

As described above, the video display 30 is a device configured by a projector or an LCD, for example. The video display 30 forms video for displaying the virtual image on the basis of an instruction from the controller 20 to project or display the video. The display distance adjusting mechanism 40 is a mechanism for adjusting a distance from the driver 5 to the displayed virtual image on the basis of an instruction from the controller 20, for example. The display distance adjusting mechanism 40 implements any one or more of various kinds of methods of adjusting the display distance as will be described later.

The mirror driver 50 adjusts an angle of the mirror 52 on the basis of an instruction from the controller 20 to adjust a position of the display area for the virtual image in a vertical direction. Adjustment of the position of the display area in the virtual image will be described later. The speaker 60 executes an audio output related to the AR-HUD 1. For example, the speaker 60 can execute audio guidance of a navigation system, an audio output when the driver 5 is notified of a warning or the like by the AR function, and the like.

Figure 3:
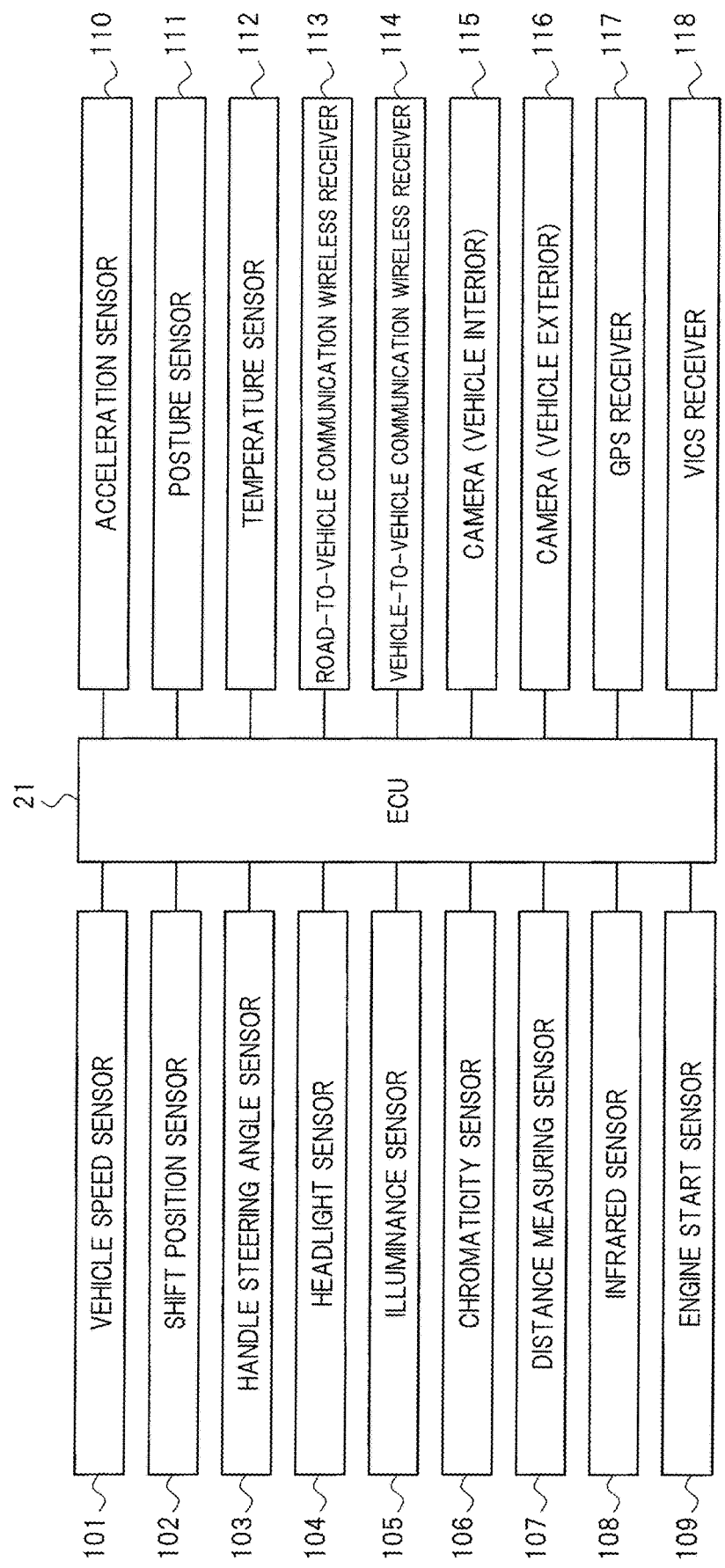
FIG. 3 is a view illustrating an outline of an example of a hardware configuration relating to acquisition of vehicle information according to the first embodiment of the present invention.

FIG. 3 is a view illustrating an outline of an example of a hardware configuration relating to acquisition of the vehicle information 4 in the head up display according to the present embodiment. Here, the hardware configuration of a part of the vehicle information acquiring unit 10 and the controller 20 is mainly illustrated in FIG. 3. Acquisition of the vehicle information 4 is executed by the information acquiring devices such as various kinds of sensors connected to an ECU (Electronic Control Unit) 21 under controls of the ECU 21, for example.

As these information acquiring devices, for example, there are devices such as a vehicle speed sensor 101, a shift position sensor 102, a handle steering angle sensor 103, a headlight sensor 104, an illuminance sensor 105, a chromaticity sensor 106, a distance measuring sensor 107, an infrared sensor 108, an engine start sensor 109, an acceleration sensor 110, an posture sensor 111, a temperature sensor 112, a road-to-vehicle communication wireless receiver 113, a vehicle-to-vehicle communication wireless receiver 114, a camera (vehicle interior) 115, a camera (vehicle exterior) 116, a GPS receiver 117, and a VICS (Vehicle Information and Communication System, registered trademark (the same applies hereinafter)) receiver 118. All of these devices are not always provided. Further, other kinds of devices may be provided. It is possible to appropriately use the vehicle information 4 that can be acquired by the provided devices.

The vehicle speed sensor 101 acquires the speed information of the vehicle 2. The shift position sensor 102 acquires current gear information of the vehicle 2. The handle steering angle sensor 103 acquires handle steering angle information. The headlight sensor 104 acquires lamp lighting information related to ON/OFF of a headlight. The illuminance sensor 105 and the chromaticity sensor 106 acquires outside light information. The distance measuring sensor 107 acquires distance information on a distance between the vehicle 2 and an external object. The infrared sensor 108 acquires infrared information related to presence or absence of an object and a distance therefrom in a short range from the vehicle 2. The engine start sensor 109 detects engine ON/OFF information.

The acceleration sensor 110 and the posture sensor 111 acquires acceleration/posture information composed of acceleration and angular velocity as information on posture and behavior of the vehicle 2. The temperature sensor 112 acquires temperature information on temperature inside and outside the vehicle 2. The road-to-vehicle communication wireless receiver 113 and the vehicle-to-vehicle communication wireless receiver 114 respectively acquire the road-to-vehicle communication information received by means of road-to-vehicle communication between the vehicle 2 and a road, a sign, a signal or the like and the vehicle-to-vehicle communication information received by means of vehicle-to-vehicle communication between the vehicle 2 and each of other surrounding vehicles.

The camera (vehicle interior) 115 and the camera (vehicle exterior) 116 respectively acquire camera video information (vehicle interior/vehicle exterior) by photographing a dynamic image of statuses of the vehicle interior and the vehicle exterior. The camera (vehicle interior) 115 photographs posture of the driver 5, a position and motion of eyes, and the like, for example. By analyzing the acquired dynamic image, it is possible to grasp a tiredness status, a position of a visual line and the like of the driver 5, for example. Further, the camera (vehicle exterior) 116 photographs a status of surroundings such as ahead or back of the vehicle 2. By analyzing the acquired dynamic image, it is possible to grasp presence or absence of a moving object such as other vehicle or a person of the surroundings, a building or a landform, a road surface status (rain, snow, freeze, unevenness, and the like), for example.

The GPS receiver 117 and the VICS receiver 118 respectively acquire GPS information acquired by receiving a GPS signal and VICS information acquired by receiving a VICS signal. They may be implemented as a part of a car navigation system that acquires and uses these kinds of information.

Figure 4:
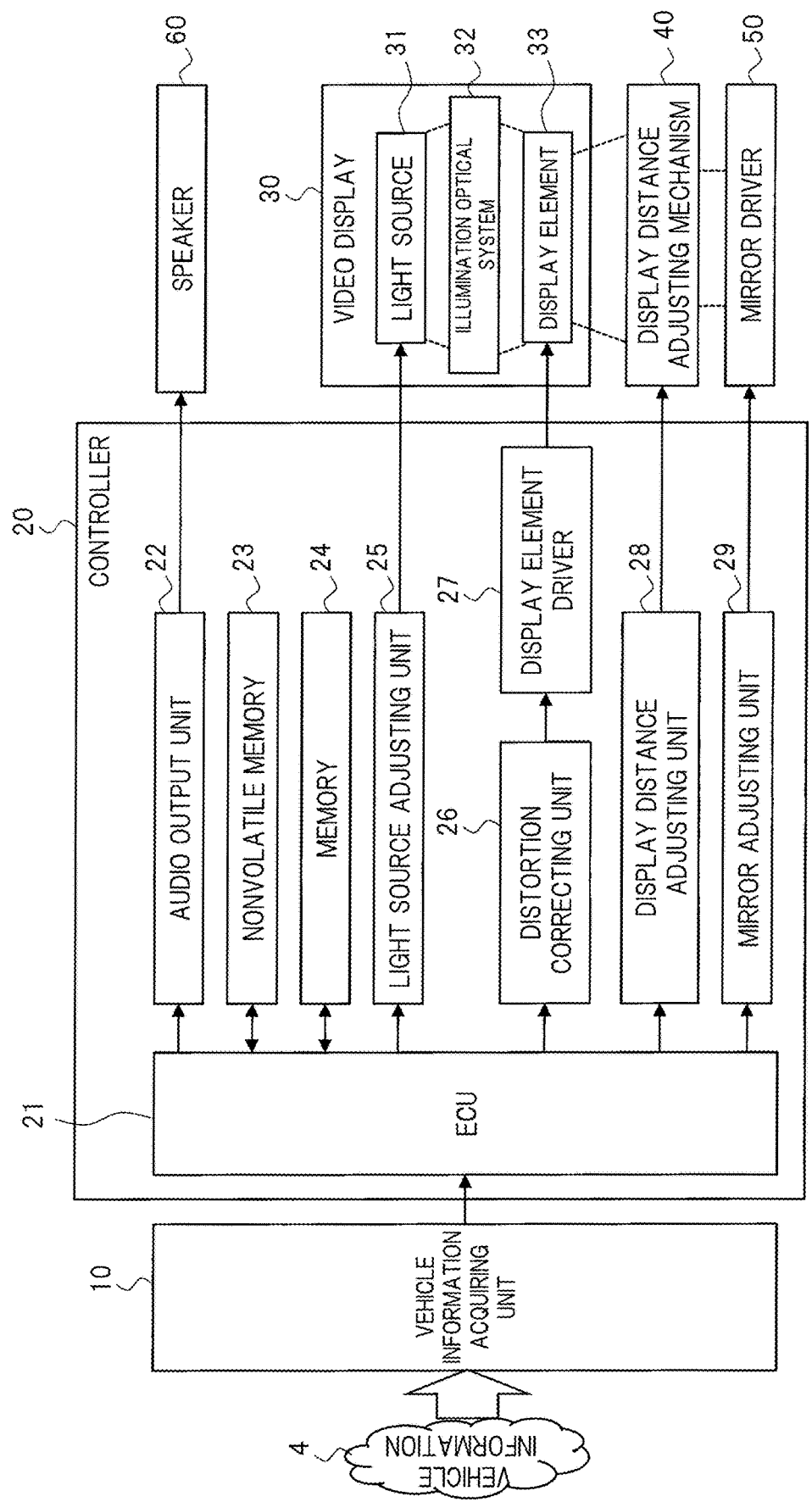
FIG. 4 is a functional block diagram illustrating details of a configuration example of the head up display according to the first embodiment of the present invention.

FIG. 4 is a functional block diagram illustrating details of a configuration example of the head up display according to the present embodiment. As an example, FIG. 4 illustrates a case where the video display 30 is a projector. The video display 30 includes respective units such as a light source 31, an illumination optical system 32, or a display element 33, for example. The light source 31 is a member that generates illumination light for projection. For example, a high-pressure mercury lamp, a xenon lamp, an LED (Light Emitting Diode) light source, a laser light source and the like can be utilized. The illumination optical system 32 is an optical system that concentrates the illumination light generated by the light source 31, and further equalizes the illumination light to irradiate the illumination light to the display element 33. The display element 33 is an element that generates video to be projected. For example, a transmissive liquid crystal panel, a reflective liquid crystal panel, a DMD (Digital Micromirror Device) (registered trademark) panel and the like can be utilized.

More specifically, the controller 20 includes respective units such as the ECU 21, an audio output unit 22, a nonvolatile memory 23, a memory 24, a light source adjusting unit 25, a distortion correcting unit 26, a display element driver 27, a display distance adjusting unit 28, and a mirror adjusting unit 29. As illustrated in FIG. 3, the ECU 21 acquires the vehicle information 4 via the vehicle information acquiring unit 10, and records, stores or reads out the acquired information in the nonvolatile memory 23 or the memory 24 as necessary. Setting information such as various kinds of set values or parameters for control may be stored in the nonvolatile memory 23. Further, the ECU 21 executes a dedicated program to generate video data related to the virtual image to be displayed as the AR-HUD 1.

The audio output unit 22 outputs audio information via the speaker 60 as needed. The light source adjusting unit 25 adjusts an amount of luminescence of the light source 31 for the video display 30. In a case where there is a plurality of light sources 31, each of them may be controlled separately. In a case where the video display 30 projects the video generated by the ECU 21 to the windshield 3 of the vehicle 2, the distortion correcting unit 26 corrects distortion of the video, which occurs due to curvature of the windshield 3, by image processing. The display element driver 27 sends a driving signal based on the video data after correction by the distortion correcting unit 26 to the display element 33, and causes the display element 33 to generate video to be projected.

In a case where there is need to adjust the display distance of the virtual image, the display distance adjusting unit 28 drives the display distance adjusting mechanism 40 to adjust the display distance of the video projected from the video display 30. Various kinds of methods of adjusting the display distance of the virtual image will be described later. In a case where there is need to adjust the position of the display area itself of the virtual image, the mirror adjusting unit 29 changes the angle of the mirror 52 via the mirror driver 50 to move the display area for the virtual image up and down. Positioning of the display area for the virtual image will be described later.

Figure 5:
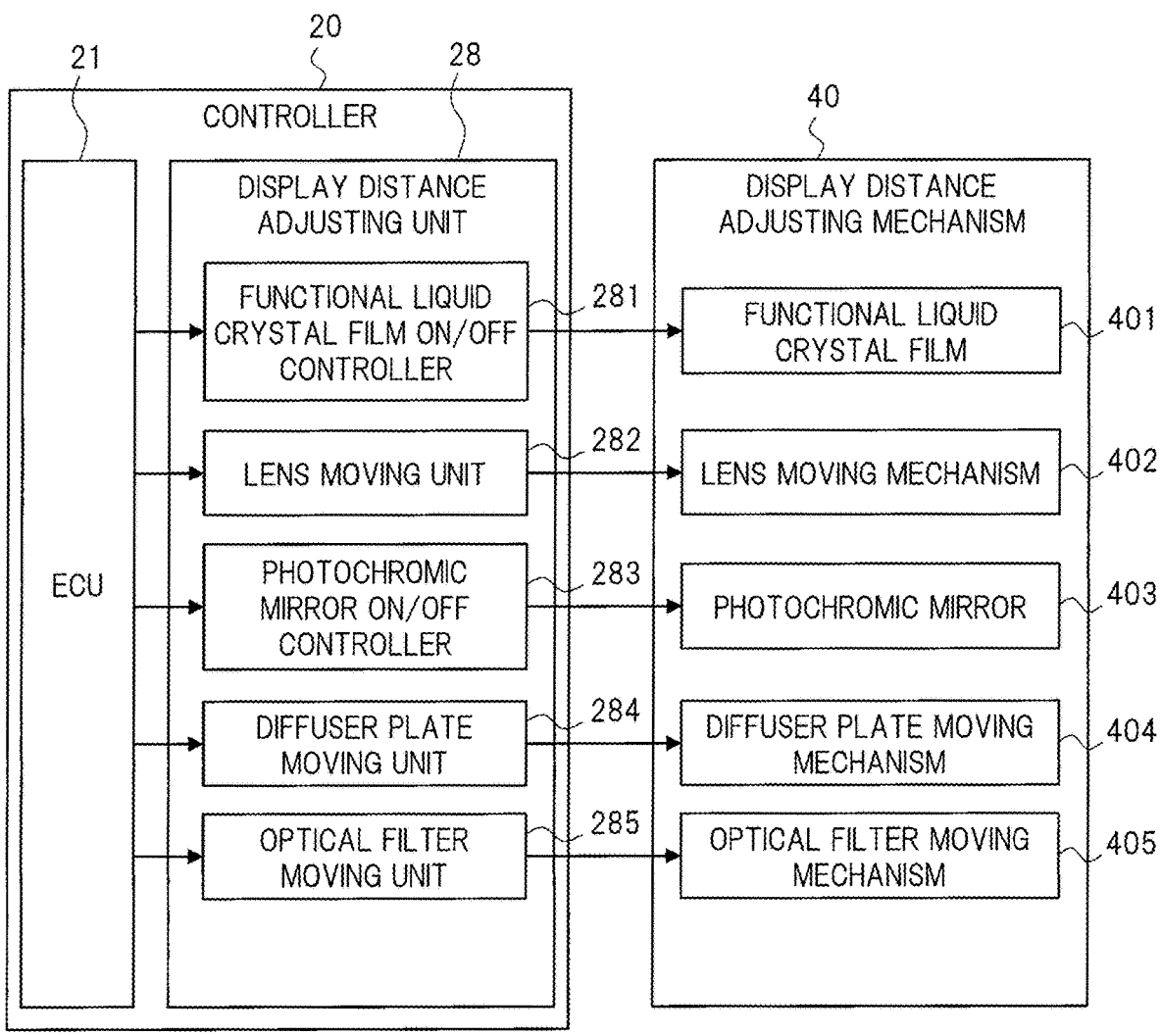
FIG. 5 is a view illustrating details of an example of a configuration relating to adjustment of a display distance according to the first embodiment of the present invention.

FIG. 5 is a view illustrating details of an example of a configuration relating to adjustment of the display distance in the head up display according to the present embodiment. The display distance adjusting unit 28 of the controller 20 further includes a functional liquid crystal film ON/OFF controller 281, a lens moving unit 282, a photochromic mirror ON/OFF controller 283, a diffuser plate moving unit 284, an optical filter moving unit 285, and the like as respective units each of which is separately controlled by the ECU 21, for example. Further, as hardware or devices that are controlled or driven by the respective units, the display distance adjusting mechanism 40 further includes a functional liquid crystal film 401, a lens moving mechanism 402, a photochromic mirror 403, a diffuser plate moving mechanism 404, an optical filter moving mechanism 405, and the like. Methods of adjusting the display distance of the virtual image by the respective units will be described later.

Note that the AR-HUD 1 does not necessarily include all of these units and devices, and the AR-HUD 1 may appropriately include units required to implement one to be applied among the methods of adjusting the display distance of the virtual image (will be described later).

<Processing Content>

Figure 6:
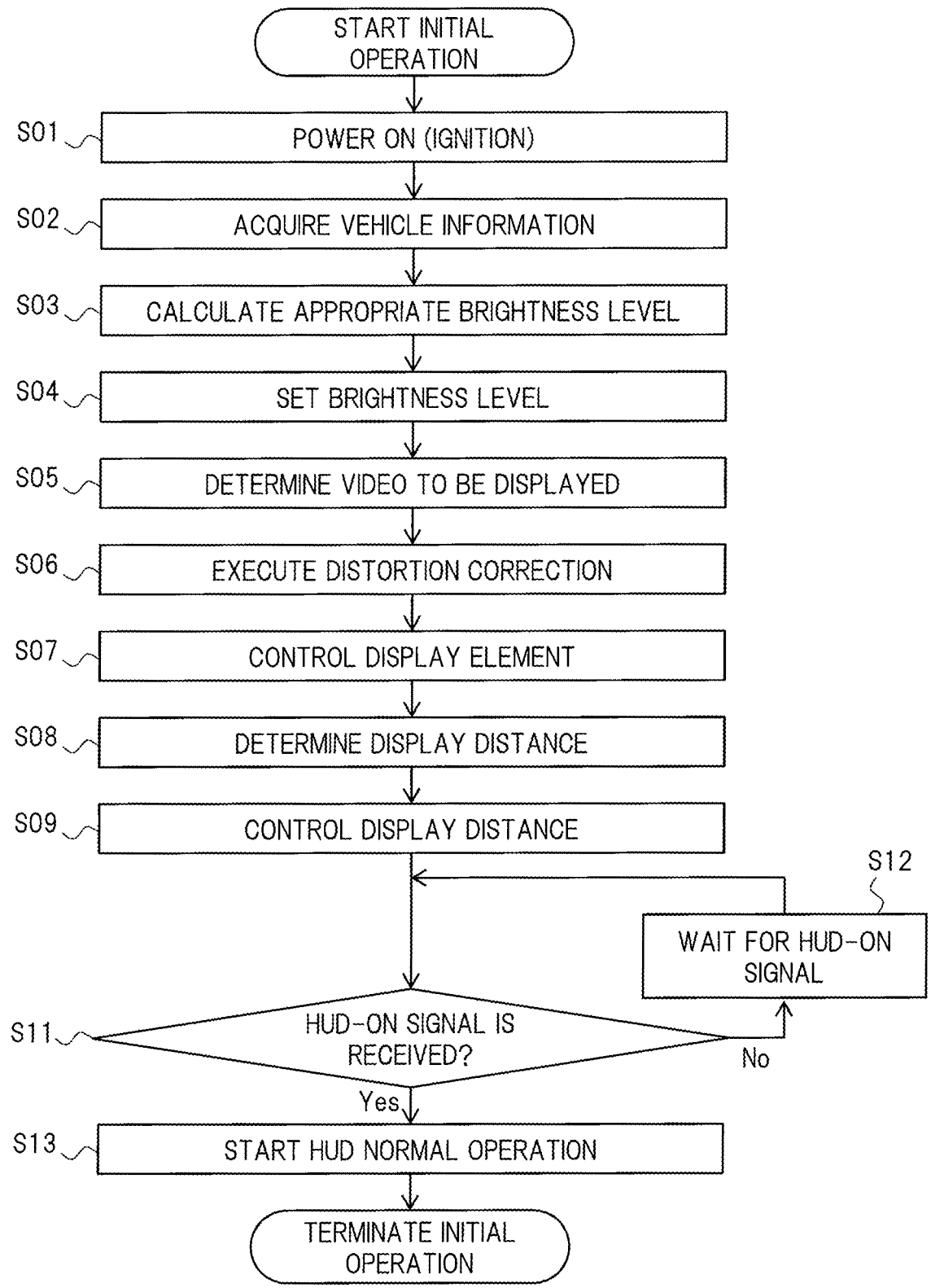
FIG. 6 is a flowchart illustrating an outline of an example of an initial operation according to the first embodiment of the present invention.

FIG. 6 is a flowchart illustrating an outline of an example of an initial operation by the head up display according to the present embodiment. When a power source for the AR-HUD 1 is turned ON by turning an ignition switch ON in the stopped vehicle 2 (S01), the AR-HUD 1 first acquires vehicle information via the vehicle information acquiring unit 10 on the basis of an instruction from the controller 20 (S02). The controller 20 then calculates an appropriate brightness level on the basis of the outside light information, which is acquired by the illuminance sensor 105 and the chromaticity sensor 106, of the vehicle information 4 (S03). The controller 20 controls the light source adjusting unit 25 to set the amount of luminescence of the light source 31 so as to become the calculated brightness level (S04). For example, in a case where the outside light is bright, the brightness level is set to be high. In a case where the outside light is dark, the brightness level is set to be low.

The ECU 21 then determines and generates video to be displayed as a virtual image (for example, an initial image) (S05). After the distortion correcting unit 26 executes a process to correct distortion with respect to the generated video (S06), the display element driver 27 drives and controls the display element 33 to form video to be projected (S07). Herewith, the video is projected onto the windshield 3, and the driver 5 is allowed to visually recognize the virtual image. The ECU 21 or the display distance adjusting unit 28 then calculates and determines a display distance of the virtual image (S08). The display distance adjusting unit 28 drives the display distance adjusting mechanism 40 to control the display distance of the video projected from the video display 30 (S09).

When activation or start of each of the units including the series of initial operation described above is completed in the whole AR-HUD 1, an HUD-ON signal is outputted. The controller 20 determines whether this signal is received or not (S11). In a case where it is determined that this signal is not received, the controller 20 further waits for the HUD-ON signal for a fixed time (S12), and repeats a waiting process for the HUD-ON signal (S12) until it is determined at Step S11 that the HUD-ON signal is received. In a case where it is determined at Step S11 that the HUD-ON signal is received, the controller 20 starts a normal operation for the AR-HUD 1 (will be described later) (S13), and terminates the series of initial operation.

Figure 7:
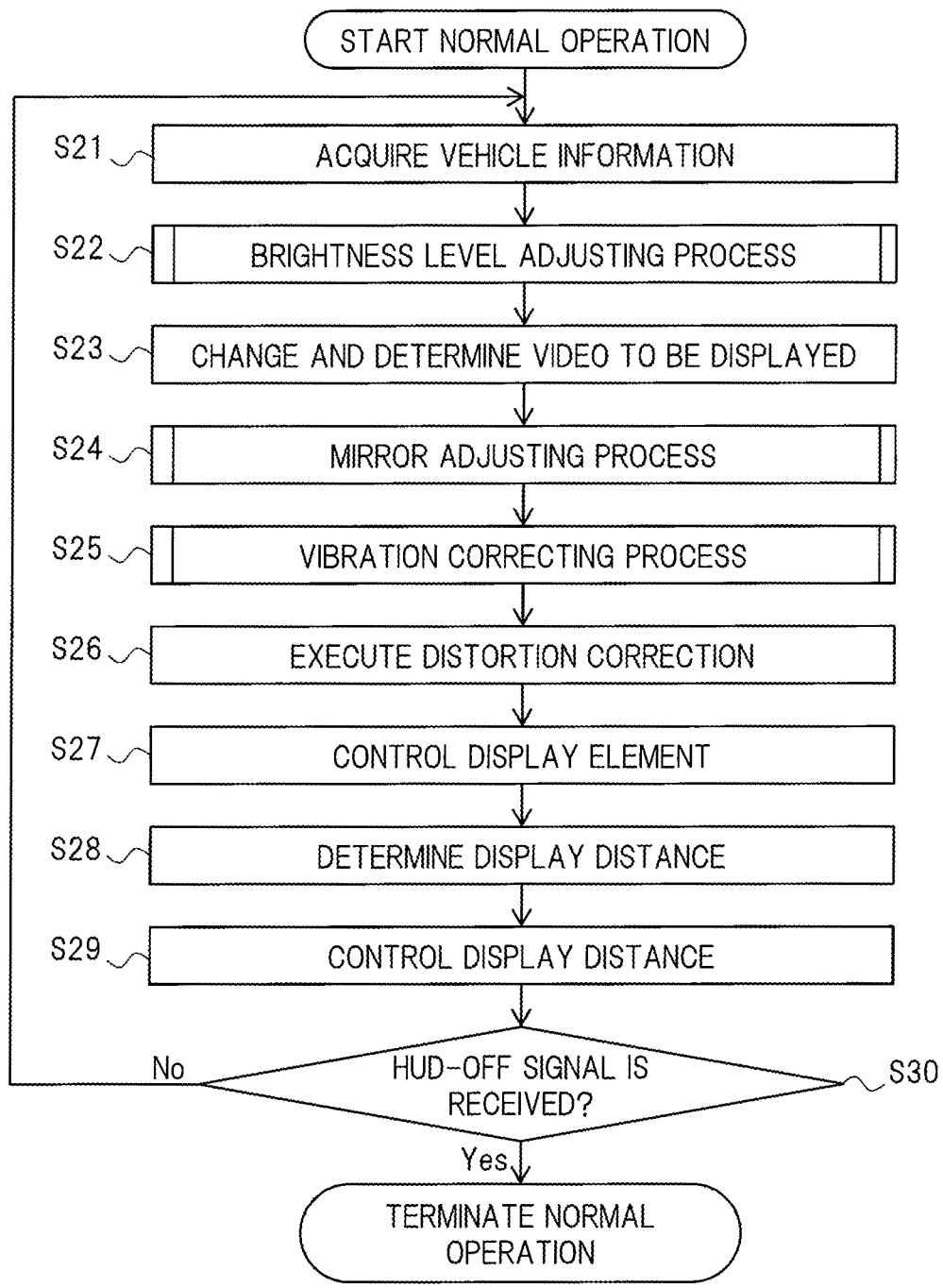
FIG. 7 is a flowchart illustrating an outline of an example of a normal operation according to the first embodiment of the present invention.

FIG. 7 is a flowchart illustrating an outline of an example of the normal operation by the head up display according to the present embodiment. A basic processing flow in the normal operation is also substantially similar to that in the initial operation illustrated in FIG. 6 described above. The AR-HUD 1 first acquires vehicle information via the vehicle information acquiring unit 10 on the basis of an instruction from the controller 20 (S21). The controller 20 then executes a brightness level adjusting process on the basis of the outside light information, which is acquired by the illuminance sensor 105 and the chromaticity sensor 106, of the vehicle information 4 (S22).

Figure 8:
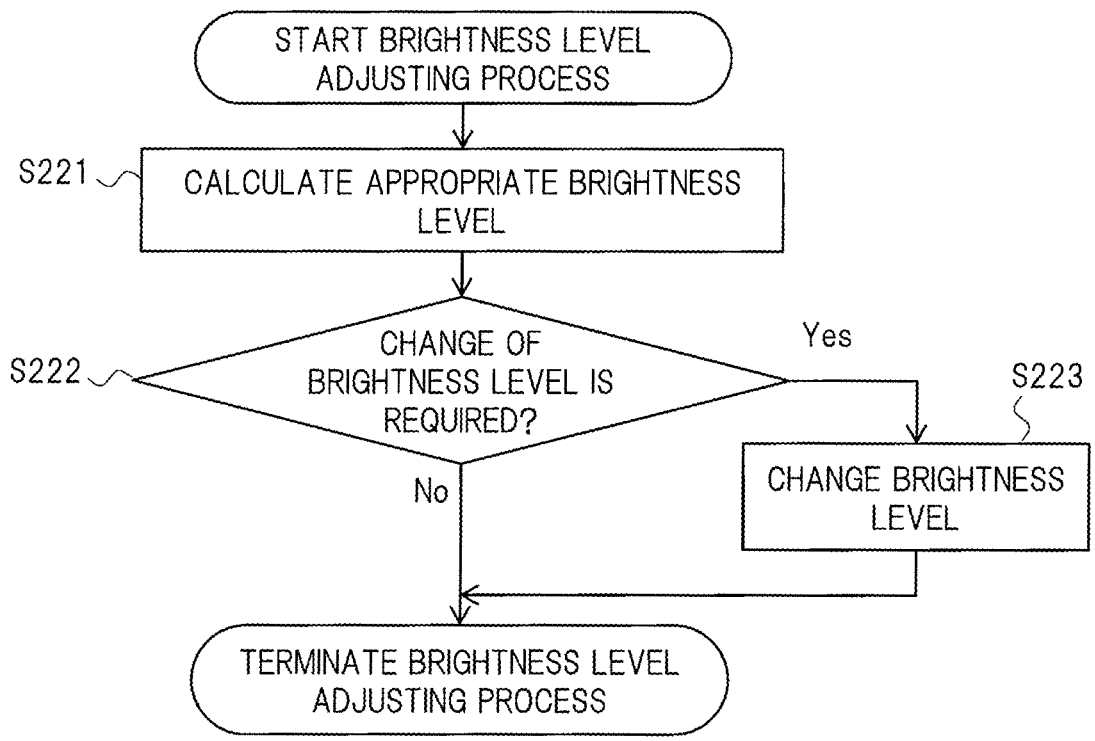
FIG. 8 is a flowchart illustrating an outline of an example of a brightness level adjusting process according to the first embodiment of the present invention.

FIG. 8 is a flowchart illustrating an outline of an example of the brightness level adjusting process by the head up display according to the present embodiment. When the brightness level adjusting process is started, the controller 20 first calculates an appropriate brightness level on the basis of the acquired outside light information (S221). The controller 20 determines whether a change in a brightness level is required or not by comparing the appropriate brightness level with a brightness level that is set currently (S222). In a case where the change is not required, the controller 20 terminates the brightness level adjusting process as it is. On the other hand, in a case where the change is required, the controller 20 controls the light source adjusting unit 25 to set the amount of luminescence of the light source 31 so as to become the brightness level after the change (S223), and terminates the brightness level adjusting process. Note that even in a case where there is a difference between the appropriate brightness level calculated at Step S221 and the brightness level currently set, it may be determined at Step S222 that the change of the brightness level is required only when the difference is equal to or more than a predetermined threshold value.

Returning to FIG. 7, the ECU 21 then changes, as needed, the video to be displayed as the virtual image from the current one on the basis of the latest vehicle information 4 acquired at Step S21, determines and generates video after change (S23). Note that there may be a large number of patterns to change display content on the basis of the vehicle information 4 in accordance with content of the acquired vehicle information 4 and their combination. For example, there may be various patterns such as a case where the speed information is changed and a numeral value of speed display, which is always displayed, is thereby changed, or a case where an arrow figure for guidance is displayed or deleted on the basis of the navigation information, or a shape and/or a display position of an arrow is changed.

In the present embodiment, the ECU 21 then executes an adjusting and/or correcting process in accordance with the traveling status of the vehicle 2 in order to maintain visibility and suitability of the display content. In a case where there is need to adjust the position of the display area for the virtual image itself, the ECU 21 first executes a mirror adjusting process to change the angle of the mirror 52 via the mirror driver 50 to move the display area for the virtual image up and down (S24). Then, the ECU 21 further executes a vibration correcting process to correct the display position of the video in the display area with respect to vibration of the vehicle 2 (S25). Detailed content of the adjusting and/or correcting process at Steps S24 and S25 will be described later.

Then, after the distortion correcting unit 26 executes the process to correct distortion for the adjusted and/or corrected video (S26), the display element driver 27 drives and controls the display element 33 to form video to be projected (S27). The ECU 21 or the display distance adjusting unit 28 then calculates and determines the display distance of the virtual image (S28), and the display distance adjusting unit 28 drives the display distance adjusting mechanism 40 to control the display distance of the video projected from the video display 30 (S29).

When the power source is turned OFF due to stoppage or the like of the vehicle 2 during execution of the series of normal operation described above, an HUD-OFF signal is outputted to the AR-HUD 1. The controller 20 determines whether this signal is received or not (S30). In a case where it is determined that the HUD-OFF signal is not received, the processing flow returns to Step S21, and the controller 20 repeats the series of normal operation until it is determined that the HUD-OFF signal is received. In a case where it is determined that the HUD-OFF signal is received, the controller 20 terminates the series of normal operation.

<Mirror Adjusting Process>

Figure 9:
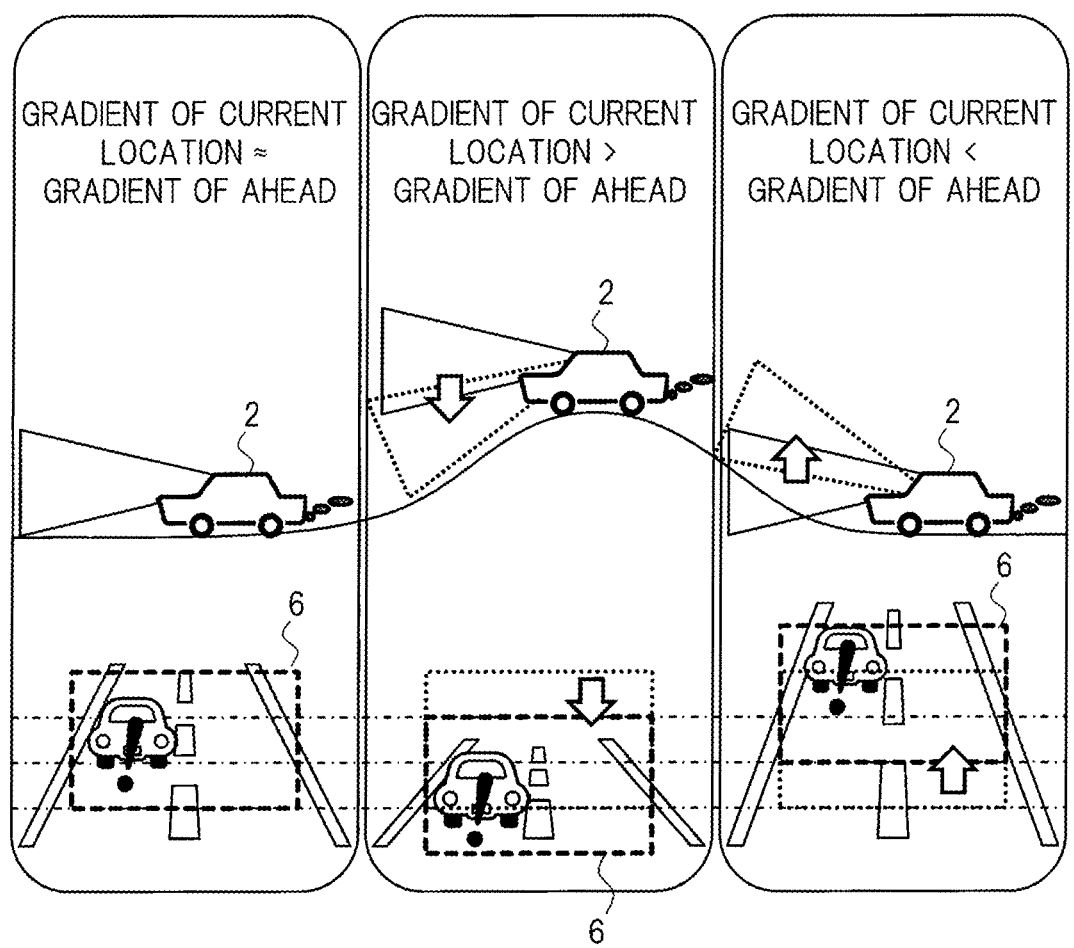
FIG. 9 is a view illustrating an outline of an example in which a position of a display area for a virtual image is adjusted up and down according to the first embodiment of the present invention.

FIG. 9 is a view illustrating an outline of an example in which the position of the display area for the virtual image is adjusted up and down in the head up display according to the present embodiment. For example, in each of left, central, and right views, an upper stage schematically illustrates a state of a status of a gradient of a road on which the vehicle 2 is traveling and a status of a viewing field of the driver 5 when viewed from a side surface thereof. Further, a lower stage schematically illustrates, in each of the states, a status of an actual view in front of the vehicle exterior, which is viewed by the driver 5, and a position of a display area 6 (a rectangle indicated by a dashed frame) of the virtual image displayed so as to be superimposed onto the actual view.

A view at a left side illustrates a case where a gradient (an upward direction) of a road at a current location of the vehicle 2 is substantially the same as a gradient (upward direction) of a road ahead as illustrated in the view of the upper stage, that is, a case where the vehicle 2 substantially travels on a flat road. In this case, as illustrated in the view of the lower stage, in order to superimpose the virtual image (in the example of FIG. 9, a mark or an image of an exclamation point) onto the actual view in front of the vehicle exterior (in the example of FIG. 9, a vehicle ahead that travels on the road) by the AR function and display it, the position of the display area 6 for the virtual image in a vertical direction may be a normal position. Namely, the position of the display area 6 illustrated in the view of the lower stage at the left side becomes a basic display position of the display area 6 in the vertical direction.

On the other hand, a view at a central portion illustrates a case where a gradient (an upward direction) of a road at a current location of the vehicle 2 is larger than a gradient of the road ahead (the upward direction), that is, a case where the vehicle 2 travels on a road in which the front is a downhill. In this case, as illustrated in the view of the upper stage, there is need to move the viewing field in a downward direction (a dotted frame in FIG. 9) in order to cause the road ahead to come into the viewing field with respect to a height of the viewing field of the driver 5 (a solid frame in FIG. 9) based on the gradient at the position of the vehicle 2. In this case, as illustrated in the view of the lower stage, the virtual image cannot be superimposed onto the actual view in front of the vehicle exterior by the AR function in a state that the display position of the display area 6 for the virtual image is the basic display position (a rectangle indicated by the dotted frame). Therefore, there is need to move the display area 6 itself in the downward direction in order to superimpose the display area 6 and display the virtual image.

Similarly, a view at a right side illustrates a case where a gradient (the upward direction) of a road at a current location of the vehicle 2 is smaller than a gradient of the road ahead (the upward direction), that is, a case where the vehicle 2 travels on a road in which the front is an uphill. In this case, as illustrated in the view of the upper stage, there is need to move the viewing field in an upward direction (the dotted frame in FIG. 9) in order to cause the road ahead to come into the viewing field with respect to the height of the viewing field of the driver 5 (the solid frame in FIG. 9) based on the gradient at the position of the vehicle 2. In this case, as illustrated in the view of the lower stage, the virtual image cannot be superimposed onto the actual view in front of the vehicle exterior by the AR function in a state that the display position of the display area 6 for the virtual image is the basic display position (the rectangle indicated by the dotted frame). Therefore, there is need to move the display area 6 itself in the upward direction in order to superimpose the display area 6 and display the virtual image.

Thus, the status that it is necessary to move the position of the display area 6 for the virtual image in the vertical direction in accordance with the traveling status is not limited to the case where there is a difference of a constant amount or more between the gradient of the current position and the gradient of the road ahead as the example illustrated in FIG. 9. For example, in a case where speed of the vehicle 2 becomes higher on a highway or the like, the visual line of the driver 5 generally becomes far away compared with a normal state, and the height of the viewing field moves in the upward direction. Therefore, for example, in order to superimpose the virtual image onto the actual view of vehicle exterior including other vehicles and the like that exists further ahead compared with the normal state, there may be need to move the display area 6 in the upward direction. When posture of a position of the driver 5 is changed while the vehicle 2 is traveling, a height position of the eyes of the driver 5 itself is changed. A case where this causes the height of the viewing field to move in the vertical direction is similar.

In the present embodiment, in the mirror adjusting process at Step S24 illustrated in FIG. 7 described above, the mirror driver 50 controls the angle of the mirror 52 in accordance with the traveling status of the vehicle 2, the position of the display area for the virtual image in the vertical direction is adjusted as illustrated in the example of FIG. 9.

Figure 10:
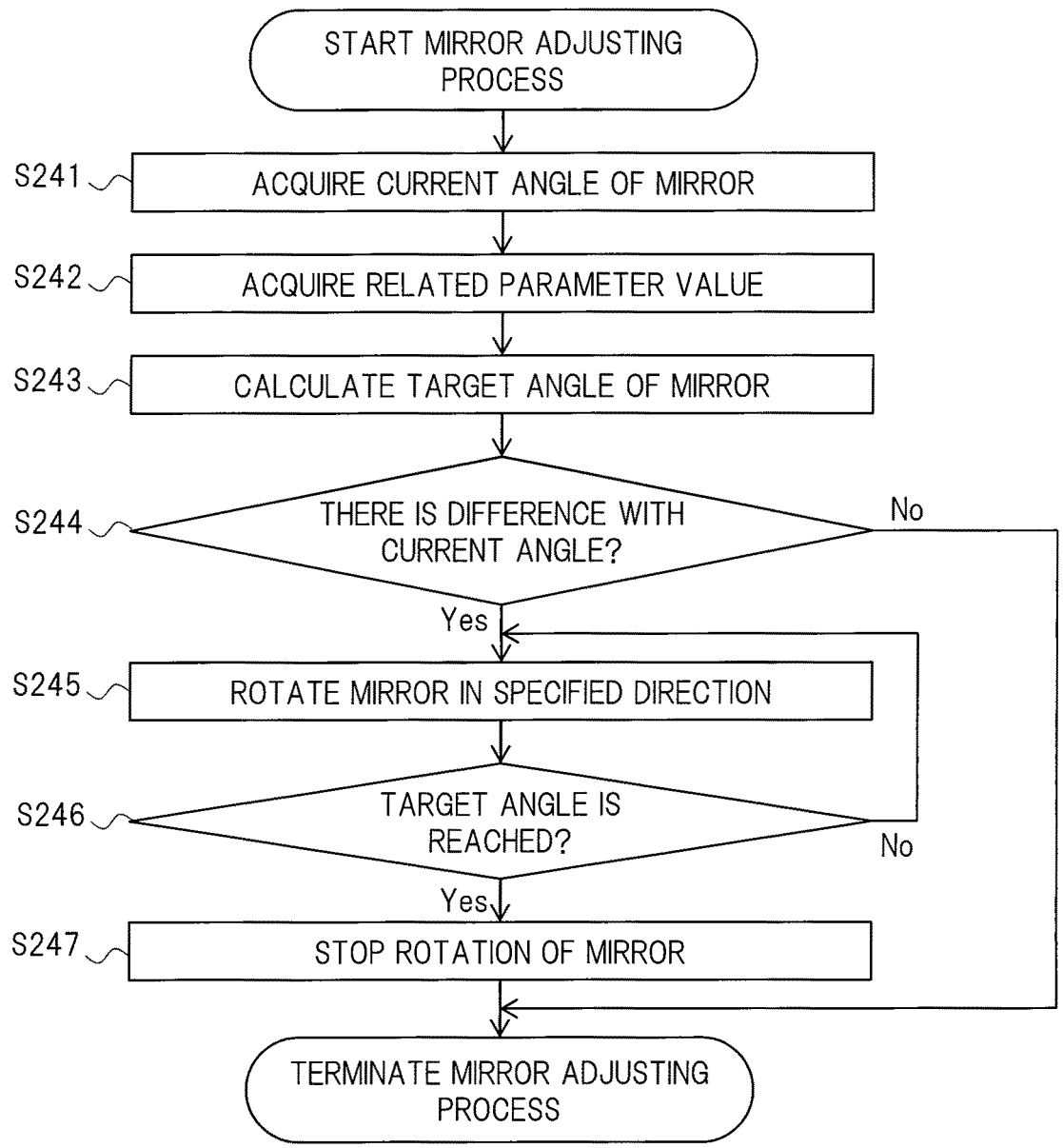
FIG. 10 is a flowchart illustrating an outline of an example of a mirror adjusting process according to the first embodiment of the present invention.

FIG. 10 is a flowchart illustrating an outline of an example of the mirror adjusting process at Step S24 of FIG. 7. When the mirror adjusting process is started, the ECU 21 first acquires a current angle of the mirror 52 (S241), and further acquires current values of parameters related to adjustment of the angle of the mirror 52 (that is, adjustment of the display position of the display area for the virtual image) on the basis of the vehicle information 4 (S242).

Kinds of parameters to be required may differentiate depending on under what condition the display position of the display area is to be adjusted. For example, in the example illustrated in FIG. 9, as the related parameter value, the ECU 21 acquires a value indicating a difference (a relative gradient) between the gradient of the current position of the vehicle 2 and the gradient of the road ahead. For example, it is possible to grasp the gradient of the current position from the information on a lean of the vehicle 2 acquired by the acceleration/posture information. Further, by analyzing the camera video information of the vehicle exterior, it is possible to grasp the gradient of the road ahead. Further, it is possible to acquire the gradient of the current position and the gradient of the road ahead on the basis of three-dimensional road/landform information acquired from the navigation information or the like.

Subsequently, the ECU 21 calculates a target angle of the mirror 52 on the basis of the parameter value acquired at Step S242, and standards and conditions defined in advance (S243). By what logic and on the basis of what parameter the target angle is calculated may differentiate depending on in what condition the display position of the display area is to be adjusted. For example, in the example illustrated in FIG. 9, in a case where the absolute value of the relative gradient between the current location and the road ahead is equal to or more than a predetermined threshold value, the ECU 21 determines the target angle of the mirror 52 in accordance with a reference numeral of the relative gradient. As the predetermined threshold value described above, 1/x ("x" is a predetermined value) or the like of FOV (Field Of View: a viewing angle) of the display area for the virtual image in the vertical direction can be used, for example.

Note that in the present embodiment, the target angle of the mirror 52 is calculated on the basis of the current parameter value acquired at Step S242. However, the ECU 21 may estimate a near future status on the basis of information regarding the current parameter value and a history of past values, and calculate the target angle on the basis of an estimation result. For example, the ECU 21 may analyze a tendency of transition of the value on the basis of a past history of the parameter value, and estimate a near future parameter value on the basis of the tendency. Further, by analyzing the camera video information in front of the vehicle exterior, it is possible to estimate a peripheral status of the vehicle 2 in the near future, and grasp a status of the road in front of the vehicle 2 on the basis of the navigation information.

Subsequently, the ECU 21 determines whether there is a difference between the current angle of the mirror 52 acquired at Step S241 and a target angle of the mirror 52 acquired at Step S243 or not (S244). With respect to this determination, for example, the ECU 21 may determine that there is a difference in a case where the difference is equal to or more than a predetermined threshold value. Further, the ECU 21 may determine that there is no difference in a case where the difference is less than the threshold value. Further, the ECU 21 may determine that there is a difference only in a case where a state that there is the difference continues for a fixed time or longer. This makes it possible to exclude an event in which a lean of the vehicle 2 changes temporarily and instantaneously, such as a case where the vehicle 2 rides on a level difference of curbstone or the like, from targets to adjust the mirror 52, for example.

In a case where it is determined at Step S244 that there is no difference between the angles, the ECU 21 terminates the mirror adjusting process as it is. Namely, the ECU 21 does not adjust the angle of the mirror 52, and maintains a current angle thereof. On the other hand, in a case where it is determined that there is a difference between the angles, the ECU 21 rotates the mirror 52 in a specified direction so as to become the target angle (S245). Specifically, the ECU 21 outputs, to the mirror driver 50, a mirror adjusting signal to rotate the mirror 52. The ECU 21 then determines whether the angle of the mirror 52 reaches the target angle or not (S246). In a case where it is determined that the angle does not reach the target angle, the processing flow returns to Step S245, and the ECU 21 causes the mirror driver 50 to continue to rotate the mirror 52. Namely, the ECU 21 continues to output the mirror adjusting signal to the mirror driver 50. On the other hand, in a case where it is determined that the angle of the mirror 52 reaches the target angle, the ECU 21 stops the rotation of the mirror 52 (S247). Namely, the ECU 21 stops outputting the mirror adjusting signal to the mirror driver 50. The ECU 21 then terminates a series of the mirror adjusting process.

<Vibration Correcting Process>

Figure 11:
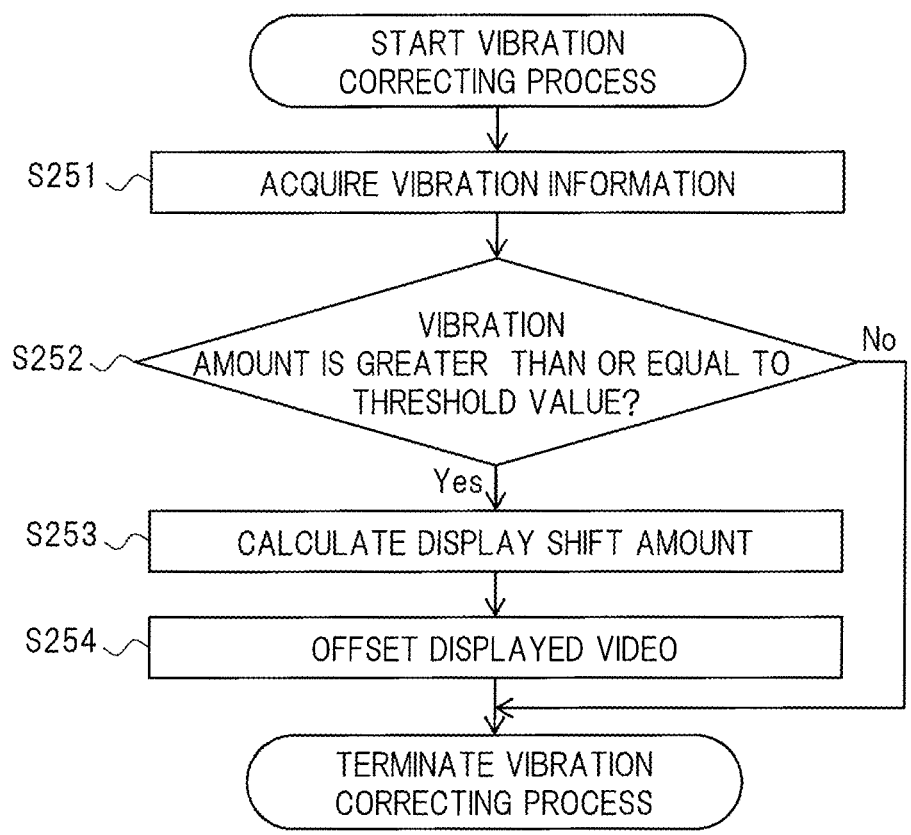
FIG. 11 is a flowchart illustrating an outline of an example of a vibration correcting process according to the first embodiment of the present invention.

FIG. 11 is a flowchart illustrating an outline of an example of the vibration correcting process at Step S25 of FIG. 7. When the vibration correcting process is started, the ECU 21 first acquires information on a vibration amount of the vehicle 2 on the basis of the vehicle information 4 (S251). For example, it is possible to grasp the vibration amount (that is, an amount of vertical motion of the vehicle 2 with a short cycle) on the basis of the acceleration/posture information, the camera video information of the vehicle exterior and the like. In the present embodiment, the information on vibration is acquired on the basis of the current vehicle information 4. However, the ECU 21 may estimate a road surface status of surroundings of the vehicle 2 in the near future by analyzing the camera video information in front of the vehicle exterior, for example, and estimate the vibration amount of the vehicle 2 in the near future on the basis of the road surface status.

The ECU 21 then determines whether the vibration amount acquired at Step S251 is equal to or more than a predetermined threshold value or not (S252). In a case where it is determined that the vibration amount is less than the threshold value, the ECU 21 terminates the vibration correcting process as it is because the vibration is minute. Namely, the ECU 21 does not execute correction of video to be displayed associated with vibration. On the other hand, in a case where it is determined that the vibration amount is equal to or more than the threshold value, the ECU 21 calculates a display shift amount of the video in the display area (S253). For example, the ECU 21 calculates the display shift amount of the video in the display area from the vibration amount of the vehicle 2 on the basis of a ration of an actual height of the vehicle 2 and a height of the display area for the virtual image. The ECU 21 then offsets a display position of the video in the display area up and down on the basis of the calculated display shift amount (S254), and the ECU 21 terminates the series of vibration correcting process.

<Adjustment of Display distance of Virtual Image>

In a case where there is need to adjust the display distance of the virtual image, the display distance adjusting unit 28 of the controller 20 drives the display distance adjusting mechanism 40 to adjust the display distance of the video to be projected from the video display 30. Hereinafter, a method of adjusting the display distance of the virtual image by each of the display distance adjusting unit 28 and the display distance adjusting mechanism 40 illustrated in FIG. 5 will be described.

[Functional Liquid Crystal Film]

FIG. 12 is a view illustrating an outline of an example of adjustment of the display distance by using the functional liquid crystal film 401 in the head up display according to the present embodiment. In the example of FIG. 12, a plurality of functional liquid crystal films 401 are used as a diffuser plate (or a diffuser) 41a. As illustrated in FIGS. 12(a) and 12(b), by changing a portion to be set to a white state for every area of each of the functional liquid crystal films 401 to change a focal distance for every area, the display distance of the virtual image (that is, a distance between the position of the eyes of the driver 5 and the display position of the virtual image) is changed.

FIG. 13 is a view illustrating an outline of a configuration example of the diffuser plate 41a by the functional liquid crystal films 401. Each of the functional liquid crystal films 401 is a film that can control a transparent state and a white state by electricity. A portion of the white state in each of the functional liquid crystal films 401 serves as a diffuser plate, and video projected by the projector 30a forms an image at this portion of the white state. In the present embodiment, with respect to each of the plurality of functional liquid crystal films 401, a plurality of areas is separately controlled so as to become a white state.

Returning to FIG. 12, in the configuration as illustrated in FIG. 12, the display position of the virtual image based on video projected from the projector 30a is determined in accordance with the portion of the white state in each of the functional liquid crystal films 401 and a distance with a lens 42a. Therefore, the plurality of functional liquid crystal films 401 is arranged so that the distances with the lens 42a are different from each other, and the functional liquid crystal film ON/OFF controller 281 illustrated in FIG. 5 sets any one of the functional liquid crystal films 401 to the white state for every area with respect to the video projected from the projector 30a. This makes it possible to change the display distance of the virtual image for each area.

Specifically, for example, as illustrated in FIG. 12(a), with respect to a target area (for example, an uppermost portion), only the functional liquid crystal film 401 arranged at the nearest position to the lens 42a is set to the white state, and the other films 401 are set to a transparent state, whereby it is possible to set the display distance of the corresponding virtual image to the nearest distance. Conversely, as illustrated in FIG. 12(b), with respect to the target area (for example, the uppermost portion), only the functional liquid crystal film 401 arranged at the farthest position from the lens 42a is set to the white state, and the other films 401 are set to the transparent state, whereby it is possible to set the display distance of the corresponding virtual image to the farthest distance.

In the examples of FIG. 12 and FIG. 13, a case where three areas for the video to be displayed are provided in the vertical direction is described as an example. However, the number of areas including examples which will be explained below is not limited to this. Further, a dividing direction is not limited to the vertical direction, and areas can of course be divided in the horizontal direction. Further, the number of functional liquid crystal films 401 is also not limited to three pieces as illustrated in FIGS. 12 and 13, and can be set appropriately in accordance with the number of areas.

[Arrangement of Plural of Mirrors]

FIG. 14 is a view illustrating an outline of an example of the adjustment of the display distance by using a plurality of mirrors in the head up display according to the present embodiment. In the example of FIG. 14, a plurality of mirrors 51a is arranged between an LCD 30b and the lens 42a as illustrated in FIG. 14. Video from the LCD 30b is reflect by different mirrors 51a for every area, and is made incident to the lens 42a. This makes it possible to differentiate distances from the LCD 30b to the lens 42a for each area, and to change the display distance of the virtual image in accordance with this.

Specifically, for example, as illustrated in FIG. 14, by displaying the video from the LCD 30b at the area reflected by the mirror 51a arranged at the farthest position from the LCD 30b (also, at the farthest position from the lens 42a), it is possible to set the display distance of the corresponding virtual image to the farthest distance. Conversely, by displaying the video from the LCD 30b at the area reflected by the mirror 51a arranged at the nearest position from the LCD 30b (also, at the nearest position from the lens 42a), it is possible to set the display distance of the corresponding virtual image to the nearest distance.

Note that in the example of FIG. 14, the number of mirror 51a is also not limited to three pieces as illustrated in FIG. 14, and can be set appropriately in accordance with the number of areas.

[Movable Lens]

FIG. 15 is a view illustrating an outline of an example of the adjustment of the display distance by using movable lenses in the head up display according to the present embodiment. In the example of FIG. 15, after video projected from the projector 30a is formed on a diffuser plate (or diffuser) 41b, the video is made incident to the mirror 52 via movable lenses 42b provided so as to be divided into a plurality of areas.

Here, it is possible to separately move each of the movable lenses 42b along an optical axis direction by the lens moving unit 282 and the lens moving mechanism 402 illustrated in FIG. 5. The display position of the virtual image based on the video projected from the projector 30a is determined in accordance with the distance between the diffuser plate 41b and each of the movable lenses 42b. Therefore, by moving the movable lenses 42b to change a focal distance for every area, it is possible to change the display distance of the virtual image.

Specifically, for example, as illustrated in FIG. 15, by moving the movable lens 42b to the nearest position to the diffuser plate 41b like the area at an uppermost portion, it is possible to set the display distance of the corresponding virtual image to the nearest position. Conversely, by moving the movable lens 42b to the farthest position from the diffuser plate 41b like the area at a lowermost portion, it is possible to set the display distance of the corresponding virtual image to the farthest distance.

Note that in the example of FIG. 15, the number of movable lenses 42b is also not limited to three illustrated in FIG. 15, and can be set appropriately in accordance with the number of areas.

[Photochromic Mirror]

FIG. 16 is a view illustrating an outline of an example of the adjustment of the display distance by using a photochromic mirror 51b in the head up display according to the present embodiment. In the example of FIG. 16, a plurality of photochromic mirrors 403 is arranged between the LCD 30b and the lens 42a as illustrated in FIG. 16 so as to constitute the photochromic mirror 51b by arranging the photochromic mirrors 403 to become a matrix shape when viewed from across sectional direction. As illustrated in FIGS. 16(a) and 16(b), by changing some of the photochromic mirrors 403 to become a mirror state, distances from the LCD 30b to the lens 42a are differentiated for every area, whereby it is possible to change the display distance of the virtual image in accordance with this.

FIG. 17 is a view illustrating an outline of a configuration example of the photochromic mirrors 403. Each of the photochromic mirrors 403 is a member, such as a film, a sheet, or a glass, which can be controlled between a transparent state and a mirror state by means of electricity. The photochromic mirrors 403 each of which becomes the transparent state transmit video from the LCD 30b, but only the photochromic mirrors 403 each of which becomes the mirror state reflect the video toward a direction to the lens 42a. In the present embodiment, the photochromic mirror ON/OFF controller 283 controls the plurality of photochromic mirrors 403 arranged in the matrix shape when viewed from the cross-sectional direction so that only one photochromic mirror 403 in each row and each column (that is, each area) becomes the mirror state.

Specifically, for example, as illustrated in FIG. 16(a), with respect to the area corresponding to the nearest column of the photochromic mirrors 403 from the lens 42a, by setting only the photochromic mirror 403 in the lowermost row to the mirror state and setting the other photochromic mirrors 403 to the transparent state, it is possible to minimize an optical path length from the LCD 30b to the lens 42a. This makes it possible to set the display distance of the corresponding virtual image to the nearest position. Conversely, with respect to the area corresponding to the farthest column of the photochromic mirrors 403 from the lens 42a, by setting only the photochromic mirror 403 in the uppermost row to the mirror state and setting the other photochromic mirrors 403 to the transparent state, it is possible to maximize the optical path length from the LCD 30b to the lens 42a. This makes it possible to set the display distance of the corresponding virtual image to the farthest distance.

Further, for example, as illustrated in FIG. 16(b), with respect to the area corresponding to the nearest column of the photochromic mirrors 403 from the lens 42a, only the photochromic mirror 403 in the uppermost row is set to the mirror state. Further, with respect to the area corresponding to the second nearest column of the photochromic mirrors 403 from the lens 42a, only the photochromic mirror 403 in the lowest row is set to the mirror state, and the other photochromic mirrors 403 are set to the transparent state. This makes it possible to relatively shorten the optical path lengths of these areas from the LCD 30b to the lens 42a, and to set the display distances of the corresponding virtual image to the nearby positions. Conversely, with respect to the area corresponding to the farthest column of the photochromic mirrors 403 from the lens 42a, by setting only the photochromic mirror 403 in the middle row to the mirror state and setting the other photochromic mirrors 403 to the transparent state, it is possible to relatively lengthen the optical path length from the LCD 30b to the lens 42a compared with the other areas. This makes it possible to set the display distance of the corresponding virtual image to the farthest distance.

Note that in the examples of FIG. 16 and FIG. 17, the number of photochromic mirrors 403 is also not limited to the 3×3 matrix as illustrated in FIGS. 16 and 17, and can be set appropriately in accordance with the number of areas.

[Movable Diffuser Plate]

FIG. 18 is a view illustrating an outline of an example of the adjustment of the display distance by using a movable diffuser plate in the head up display according to the present embodiment. In the example of FIG. 18, after video projected from the projector 30a is formed on a movable diffuser plate (movable diffuser) 41c, the video is made incident to the mirror 52 via the lens 42a.

Here, the movable diffuser plate 41c can move and/or rotate along an optical axis direction by means of the diffuser plate moving unit 284 and the diffuser plate moving mechanism 404 illustrated in FIG. 5. A display position of a virtual image based on video projected from the projector 30a is determined in accordance with a distance and/or a lean between the movable diffuser plate 41c and the lens 42a. Therefore, by moving and/or rotating the movable diffuser plate 41c to change a focal distance, it is possible to change the display distance of the virtual image.

Specifically, by moving the movable diffuser plate 41c to a position near the lens 42a and/or rotating the movable diffuser plate 41c so as to approach the lens 42a, it is possible to set the display distance of the virtual image to a nearby position. Conversely, by moving the movable diffuser plate 41c to a position far from the lens 42a and/or rotating the movable diffuser plate 41c so as to go away from the lens 42a, it is possible to set the display distance of the virtual image to a faraway position.

[Movable Optical Filter]

FIG. 19 is a view illustrating an outline of an example of the adjustment of the display distance by using a movable optical filter in the head up display according to the present embodiment. In the example of FIG. 19, a movable optical filter 43a is mounted between the lens 42a and the diffuser plate (diffuser) 41b. As illustrated in FIGS. 19(a) and 19(b), by inserting or removing the movable optical filter 43a with respect to an optical path, focal distances are changed for every area to change a display distance of a virtual image.

The optical filter is a member having a property to change a focal distance by means of a single body or combination of optical component(s) such as a lens. In the present embodiment, by combining a plurality of optical filters each having a different refractive index from that of the others, one optical filter with areas each having a different refractive index is formed to be constituted as the movable optical filter 43a that is allowed to be inserted and removed with respect to the optical path. Since focal distances of the optical filter are different for each area, the optical filter moving unit 285 and the optical filter moving mechanism 405 illustrated in FIG. 5 inserts and removes the movable optical filter 43a with respect to the optical path, whereby it is possible to change the display distance of the virtual image for each area.

Specifically, for example, as illustrated in FIG. 19(a), by inserting the whole movable optical filter 43a into the optical path, it is possible to set the focal distance of the optical filter 43a corresponding to an area of the lowest stage to the shortest distance, and set the display distance of the virtual image to the farthest distance. Further, by setting the focal distance of the optical filter 43a corresponding to an area of the uppermost stage, it is possible to set the display distance of the virtual image to the nearby position. Further, for example, as illustrated in FIG. 19(b), by removing a part of the movable optical filter 43a so that video corresponding to the area of the lowest stage does not pass through the optical filter 43a, the display distance of the virtual image for this area is determined in accordance with a distance between the diffuser plate 41b and the lens 42a, whereby it is possible to set the display distance of the virtual image to a faraway position than that of the other areas for which video passes through the optical filter 43a.

Note that in the example of FIG. 19, the number of areas whose focal distance are different from each other in the movable optical filter 43*a* is also not limited to three as illustrated in FIG. 19, and can be set appropriately in accordance with the number of areas.

[Comb-Shaped Optical Filter]

FIG. 20 is a view illustrating an outline of an example of the adjustment of the display distance by using a comb-shaped optical filter in the head up display according to the present embodiment. In the example of FIG. 20, after video projected from the projector 30*a* is formed on the diffuser plate (diffuser) 41*b*, the video is made incident to the mirror 52 via a comb-shaped optical filter 43*b* and the lens 42*a*.

The comb-shaped optical filter 43*b* has a similar function to that of a lens. The comb-shaped optical filter 43*b* is a member in which an optical filter portion is provided in a comb-shaped manner, and that can change a display distance of a virtual image in accordance with a focal distance. As illustrated in FIG. 20, for example, by handling the optical filter portion and a portion that is not the optical filter by a line unit (which is not limited to every one line, and can be constituted by every any number of lines) of video projected from the projector 30*a*, it is possible to change the display distance of the virtual image for each line unit.

Specifically, it is possible to set the display distance of the virtual image based on the video of the line corresponding to the optical filter portion to a nearby position, and to set the display distance of the virtual image based on the video of the line corresponding to the portion that is not the optical filter to a faraway position.

As explained above, according to the head up display of the first embodiment of the present invention, even in a case where the virtual image cannot be superimposed onto the actual view in front of the vehicle 2 depending upon the traveling status of the vehicle 2, it becomes possible to realize the AR function to appropriately superimpose the virtual image onto the actual view ahead by dynamically adjusting the display position of the display area for the virtual image itself in the vertical direction. Moreover, it also becomes possible to appropriately adjust the display distance of the virtual image in accordance with the traveling status and the like.

Second Embodiment

<Problems>

In the head up display according to the first embodiment described above, as illustrated in the example of FIG. 9, in a case where there is a difference between a gradient of a current traveling position and a gradient of a road ahead, a position of a display area for a virtual image in a vertical direction is adjusted in a manner of hardware by the mirror adjusting process to control an angle of a mirror 52 by a mirror driver 50 in accordance with a traveling status of a vehicle 2. Further, in a case where a vibration amount of the vehicle 2 exceeds a predetermined threshold value, a vibration correcting process to offset a display position of video in a display area up and down in a manner of software is executed. These processes allow the virtual image to be appropriately superimposed onto an actual view ahead against a lean or vibration of the vehicle 2.

On the other hand, there are various modes of the lean or vibration (hereinafter, also collectively referred to as "jolting") of the vehicle 2, and these may often occur so as to be combined. Therefore, there is need to flexibly handle various kinds of modes of jolting of the vehicle 2 so that display of a virtual image can be adjusted. FIG. 21 to FIG. 23 are views each illustrating an outline of an example of jolting of the vehicle 2 and a normal display state of the virtual image.

In FIG. 21, as well as the example of FIG. 9, in each of left and right views, an upper stage schematically illustrates a state of a status of a road on which the vehicle 2 is traveling and a status of a viewing field of the driver 5 when viewed from a side surface thereof. Further, a lower stage schematically illustrates, in each of the states, a status of an actual view in front of the vehicle exterior, which is viewed by the driver 5, and a position of a display area 6 (a rectangle indicated by a dashed frame) of the virtual image displayed so as to be superimposed onto the actual view.

A view at a right side of FIG. 21 illustrates a case where the vehicle 2 is traveling on a substantially flat road as illustrated in the view of the upper stage. In this case, as illustrated in the view of the lower stage, in order to superimpose the virtual image (in the example of FIG. 21, a mark or an image of an exclamation point) onto the actual view in front of the vehicle exterior (in the example of FIG. 21, a vehicle ahead that travels on the road) by the AR function and display it, the position of the display area 6 for the virtual image in a vertical direction may be a normal position. Namely, the position of the display area 6 illustrated in the view of the lower stage at the right side becomes a basic display position of the display area 6 in the vertical direction.

On the other hand, a view at a left side illustrates a case where there is unevenness on a road surface at a current location of the vehicle 2. In this case, in a case where any adjustment or the like is not executed particularly, as illustrated in the view of the lower stage, positions of the virtual image and the display area 6 therefor are also shaken in the relatively vertical direction with the actual view in front of the vehicle exterior in accordance with jolting of the vehicle 2 in the vertical direction (a pitch direction). Herewith, the virtual image is displayed at a position at which the virtual image is not superimposed onto the actual view in front of the vehicle exterior, whereby an uncomfortable feeling given to the driver 5 becomes stronger. Further, since the virtual image is shaken, the driver 5 who views this may become carsick.

Further, in FIG. 22, in each of left, central, and right views, an upper stage schematically illustrates a state that a status of an inclination of a road on which the vehicle 2 is traveling when viewed from the rear of the vehicle 2. Further, a lower stage schematically illustrates a status of an actual view in front of vehicle exterior viewed by the driver 5 and a position of a display area 6 for the virtual image superimposed and displayed on the actual view in each state. As illustrated in the view of the upper stage, the central view of FIG. 22 illustrates a case where the vehicle 2 is traveling on a substantially flat road. In this case, as illustrated in the view of the lower stage, the display area 6 of the virtual image is displayed at a basic display position without being inclined.

On the other hand, as illustrated in the view of the upper stage, the right and left views respectively illustrate cases where road surfaces at a current location of the vehicle 2 are inclined in a horizontal direction. In this case, in a case where any adjustment or the like is not executed particularly, as illustrated in the view of the lower stage, the virtual image and the display area 6 are also inclined in a horizontal direction in accordance with an inclination of the vehicle 2 in the horizontal direction (a roll direction). Herewith, as well as the example of FIG. 21, the virtual image is displayed at a position at which the virtual image is not superimposed onto the actual view in front of the vehicle exterior, whereby an uncomfortable feeling given to the driver 5 becomes stronger. Further, the driver 5 may become carsick due to shaking of the virtual image.

Moreover, FIG. 23 illustrates a case where jolting of the vehicle 2 in a vertical direction (a pitch direction) and an inclination in a horizontal direction (a roll direction) occur at the same time so as to be combined. In this case, as illustrated in the view of the lower stage, the virtual image and the display area 6 are inclined in the horizontal direction, and the display position is also shaken in the vertical direction.

<Outline of Control>

In order to handle these statuses flexibly and cause the virtual image to be appropriately superimposed onto the actual view ahead, the head up display according to the second embodiment of the present invention is improved so that the mirror adjusting process and the vibration correcting process (Steps S24 and S25 in FIG. 7) in the head up display according to the first embodiment correspond to various kinds of modes of jolting of the vehicle 2 more flexibly.

Specifically, in the present embodiment, in the hardware configuration for acquiring the vehicle information 4, which has been described above with reference to FIG. 3, two posture sensors 111 are provided to separately detect jolting in the vertical direction (the pitch direction) and an inclination in the horizontal direction (the roll direction). Namely, a first posture sensor 111 (not illustrated in the drawings) detects jolting in the vertical direction (the pitch direction) (which is grasped by a lean of the vehicle 2 in a front-back direction), and a second posture sensor 111 detects an inclination of the vehicle 2 in the horizontal direction (the roll direction). The display position of the virtual image in the vertical direction is then adjusted in accordance with an angle detected by the first posture sensor 111. Further, a lean of display of the virtual image in the horizontal direction is adjusted in accordance with an angle detected by the second posture sensor 111. Moreover, by combining these kinds of adjustment, it is possible to execute the adjustment in the vertical direction and the adjustment of the lean in the horizontal direction at the same time.

A mounting position of the first and second posture sensors 111 on the vehicle 2 is not limited particularly. However, both posture sensors 111 can be mounted in a housing of the AR-HUD 1, for example. Alternatively, both posture sensors 111 may be mounted on a predetermined place outside the housing, and detected information may be taken in the AR-HUD 1 by the vehicle information acquiring unit 10. In this case, both posture sensors 111 may be mounted on a driver's seat or the like so that values acquired by approximating shaking and inclination that occur on the driver 5 can be acquired. The first and second posture sensors 111 may be mounted on both the inside of the housing of the AR-HUD 1 and the outside of the housing of the driver's seat, the ECU 21 may analyze jolting, a lean, posture and the like of the vehicle 2 on the basis of information acquired from these, and execute the adjustment on the basis of this. Further, three or more posture sensors may be mounted to detect the jolting of the vehicle 2 in more detail.

In order to detect the jolting of the vehicle 2 in the vertical direction (the pitch direction) and the inclination in the horizontal direction (the roll direction), alternatively to use the two first and second posture sensors 111 as the hardware configuration to acquire the vehicle information 4, or in addition to the first and second posture sensors 111, the camera (vehicle exterior) 116 can be used. Namely, by calculating a shift amount at predetermined time intervals in image data of the actual view ahead photographed by the camera (vehicle exterior) 116, it is possible to detect jolting of the vehicle 2. The other configuration and the processing content of the head up display according to the present embodiment are basically similar to those illustrated in the first embodiment described above. Thus, repeated explanation will be omitted.

FIG. 24 is a view illustrating an outline of an example in which the display position of the virtual image is adjusted up and down in the head up display according to the present embodiment. FIG. 24 (*a*) illustrates, in the similar example to the example of FIG. 21 described above, for example, an example of a case where the vehicle 2 jolts in an upward direction (that is, in a pitch direction in which the front part of vehicle 2 is relatively raised up compared with the rear part of the vehicle 2) while the vehicle 2 is traveling on a bumpy road in the view of a left side. In the present embodiment, in this case, adjustment of the display position of the display area 6 itself for the virtual image is not executed temporarily. Therefore, as well as the example of FIG. 21, the display area 6 itself is relatively moved in the upward direction with respect to the actual view in front of the vehicle exterior with jolting of the vehicle 2 in the upward direction (in the pitch direction in which the front part of vehicle 2 is relatively raised up compared with the rear part of the vehicle 2).

At this time, in a case where the adjustment is not executed particularly as the example illustrated in FIG. 21, the virtual image displayed in the display area 6 (in the example of FIG. 21, a mark or an image of an exclamation point) is also relatively moved in the upward direction along with the display area 6. On the other hand, in the present embodiment illustrated in the example of FIG. 24(*a*), as illustrated in the view of the lower stage, it is controlled so that an absolute display position of the virtual image, which is displayed therein, is not changed from an original display position as much as possible even though the display area 6 for the virtual image is moved in the upward direction. Namely, when the ECU 21 generates video data related to the virtual image, the ECU 21 controls, in a manner of software, so that a relative display position of the virtual image is moved downward in the display area 6 that is moved in the upward direction.

FIG. 24(*b*) illustrates, in an example similar to that of FIG. 24(*a*), a case where since jolting of the vehicle 2 in the upward direction (in the pitch direction in which the front part of vehicle 2 is relatively raised up compared with the rear part of the vehicle 2) is large, the virtual image protrudes (or goes out) from a lower end (or end portion) of the display area 6 by moving the display position of the virtual image to an appropriate position, at which the virtual image can be superimpose onto the actual view ahead, in a downward direction. In the present embodiment, in this case, when the ECU 21 generates the video data related to the virtual image, as illustrated in the view of a left side of FIG. 24(*b*), it is controlled so that movement of the virtual image in the downward direction is stopped at the lower end of the display area 6 because the virtual image does not protrude from the lower end of the display area 6 (it is desirable that at least a half or more of the virtual image is displayed in the display area 6). This makes it possible to avoid a situation that a half of the virtual image cannot be viewed or a situation that the virtual image cannot be viewed at all. This allows the driver 5 to always recognize the virtual image visually, whereby anxiety or an uncomfortable feeling generated on the driver 5 is reduced.

Note that FIG. 24 illustrates, as an example, the case where the vehicle 2 jolts in the upward direction (in the pitch direction in which the front part of vehicle 2 is relatively raised up compared with the rear part of the vehicle 2). However, in a case where the vehicle 2 jolts in a downward direction (that is, in a pitch direction in which the front part of the vehicle 2 is relatively dropped down compared with the rear part of the vehicle 2), a control that is contrary to the above is to be executed. Further, with respect to an inclination of the vehicle 2 in a horizontal direction (a roll direction), it is possible to adjust the display position of the virtual image by rotating display of the virtual image in the horizontal direction in the similar way.

In the example illustrated in FIG. 24, the ECU 21 does not execute adjustment of the display position of the display area 6 itself for the virtual image and the inclination (hereinafter, also collectively referred to as "display state") with respect to jolting of the vehicle 2, but adjusts only the display state of the virtual image displayed therein in the manner of software. Therefore, even in a case where vibration and an inclination are combined on the vehicle 2 complicatedly, it is possible to flexibly adjust the display state of the virtual image. On the other hand, as illustrated in the first embodiment, by rotating the mirror 52 by means of the mirror driver 50, it is also possible to move the display area 6 itself for the virtual image in the vertical direction. This makes it possible to control the display position in the manner of hardware so that the display position of the display area 6 is not shaken even in a case where jolting of the vehicle 2 occurs.

FIG. 25 is a view illustrating an outline of an example in which the display position of the virtual image is adjusted up and down in the head up display according to the present embodiment. FIG. 25(*a*) illustrates, in an example similar to the example of FIG. 21 described above, that even in a case where the vehicle 2 jolts in a vertical direction (a pitch direction) while the vehicle 2 is traveling on a bumpy road of the view of a left side, in the present embodiment, the display area 6 is adjusted so that a position of the display area 6 itself for the virtual image is not shaken in the vertical direction.

FIG. 25(*b*) illustrates an example in which in order to execute the adjustment as illustrated in FIG. 25(*a*), by rotating a mirror 52 around a rotation axis of a horizontal direction, a direction to reflect video projected from the video display 30 is changed to move a position to be projected onto a windshield 3 in the vertical direction. The method of adjusting the position of the display area 6 itself for the virtual image in the vertical direction is not limited to the method of rotating the mirror 52. As illustrated in FIG. 25(*c*), even by moving the position of the mirror 52 in an optical axis direction forward or backward, it is also possible to move a position at which the video projected from the video display 30 is projected onto the windshield 3 in the vertical direction. The rotation of the mirror 52 illustrated in FIG. 25(*b*) and the movement of the mirror 52 illustrated in FIG. 25(*c*) in the front-back direction may be combined.

FIG. 26 is a view illustrating an outline of a configuration example of the mirror 52 and the mirror driver 50 in the head up display according to the present embodiment. FIG. 26(*a*) is a perspective view illustrating a concrete configuration example of the mirror 52 and the mirror driver 50. The mirror driver 50 is composed of a supporting member 54*a* and a mirror holding member 54*b*, for example. These members and the mirror 52 are combined via mirror driving shafts A (53*a*) to C (53*c*) as illustrated in FIG. 26. A position and an angle of the mirror 52 can be adjusted by rotating each of the mirror driving shafts A (53*a*) to C (53*c*).

FIG. 26 (*b*) is a view schematically illustrating a state where the mirror 52 and the mirror driver 50 are fixed in the housing of the AR-HUD 1 when viewed from a side surface thereof. For convenience of explanation, x, y, and z axes are also displayed together. For example, by rotating the mirror driving shafts A (53*a*) and C (53*c*) counterclockwise by using the y axis as an axis and rotating the mirror driving shaft B (53*b*) clockwise from a state illustrated in a central view, as illustrated in a view of a left side, it is possible to move the position of the mirror 52 in a minus z direction while maintaining the angle of the mirror 52.

Conversely, by rotating the mirror driving shafts A (53*a*) and C (53*c*) clockwise by using the y axis as an axis and rotating the mirror driver B (53*b*) counterclockwise, as illustrated in a view of a right side, it is possible to move the position of the mirror 52 in a plus z direction while maintaining the angle of the mirror 52. Further, separately from these kinds of movement, or in addition to these kinds of movement, by adjusting rotation of the mirror driving shaft C (53*c*) and the like, it is possible to adjust the angle of the mirror 52.

Further, a rotary drive mechanism (not illustrated in the drawings) rotates the whole mirror driver 50 or the whole AR-HUD 1 by using the z axis as an axis, whereby it is possible to rotate the display area 6 itself for the virtual image that is reflected by the mirror 52 and projected onto the windshield 3 in a horizontal direction. FIG. 27 is a view illustrating an outline of an example in which right and left lean of the display area for the virtual image is adjusted in the head up display according to the present embodiment. FIG. 27(*a*) illustrates that even in a case where the vehicle 2 is inclined in the horizontal direction (a roll direction) while the vehicle 2 is traveling on an inclined road, in the present embodiment, a lean of the display area 6 itself for the virtual image in the horizontal direction is adjusted so as not to be shaken. At this time, as illustrated in FIG. 27(*b*), for example, the whole AR-HUD 1 is rotated in an opposite direction by using the z axis as an axis so as to be inclined in accordance with an inclination of the vehicle 2. This makes it possible to rotate the display area 6 itself for the virtual image in the horizontal direction and adjust a display position thereof, whereby it is possible to control the display area 6 in the manner of hardware so that a shift is generated in the lean of the display area 6 with respect to the actual view ahead. It is also possible to move the whole AR-HUD 1 in the front-back direction (a z axis direction). In the example described above, in a case where the whole AR-HUD 1 is not rotated or moved and the mirror driver 50 mounted therein is rotated or moved, there is need to provide a rotary drive mechanism or a moving mechanism inside the AR-HUD 1. Therefore, a demerit that a body size of the AR-HUD 1 becomes larger may be generated. There is only a limited space in a dashboard of the vehicle 2. Thus, a case where it is difficult to store the AR-HUD 1 in the dashboard may occur when the body size thereof becomes larger.

On the other hand, in a case where the AR-HUD 1 itself is rotated, there is need to provide a rotating mechanism outside the body of the AR-HUD 1. However, in this case, the size of the AR-HUD 1 itself does not become larger. Further, even though the rotating mechanism provided outside the AR-HUD 1 is considered to be included, it is possible to implement a mechanism for adjusting the lean of the display area 6 with space saved compared with the case where the mirror driver 50 is rotated or moved inside the AR-HUD 1.

It is possible to combine and use the method of adjusting the display state of the virtual image in the manner of software by the ECU 21 and the method of adjusting the display state of the display area 6 itself for the virtual image in the manner of hardware by rotating or moving the mirror 52. FIG. 28 is a view illustrating an outline of an example in which the virtual image and a display position of the display area 6 are adjusted up and down in the head up display according to the present embodiment. Here, as well as the example of FIG. 24(*b*) described above, even though jolting of the vehicle 2 is large and the virtual image protrudes from the display area 6 only by the adjustment of the display position of the virtual image in the manner of software, the display position of the display area 6 itself is adjusted up and down by rotating or moving the mirror 52. By adjusting the display position of the virtual image within the display area 6, whose display position is adjusted in this manner, in the manner of software, it is possible to appropriately superimpose the virtual image onto the actual view ahead so that the virtual image falls in the display area 6 and display the virtual image.

In the example of FIG. 28, with respect to the virtual image (in the example of FIG. 28, a mark or an image of an exclamation point) superimposed onto the actual view of the vehicle ahead and displayed in accordance with jolting of the vehicle 2 in the vertical direction (the pitch direction), the display position thereof is adjusted, and superimposing onto the actual view of the vehicle ahead is continued. However, control content related to the adjustment of the display position may be changed in accordance with a property of the virtual image. For example, a virtual image such as meters and gauges, which is not required to be superimposed onto the actual view ahead, (for example, display of speed of "35 km" in the example of FIG. 28) may make an exception for the adjustment of the display position in the display area 6 due to jolting of the vehicle 2 (that is, display of such a virtual image is shaken with jolting of the vehicle 2).

Further, the similar control to the virtual image for which there is need to be superimposed onto the actual view ahead may be executed for such a virtual image in accordance with the property of the virtual image, and display thereof may be adjusted in the display area 6. For example, in order to monitor a blind spot at the rear and the side of the vehicle, video of the spot may be acquired by the camera (vehicle exterior) 116 as a so-called electron mirror, and this may be displayed in the display area 6 as a virtual image. In this case, the virtual image of the monitored video is not displayed in the entire display area 6, but is generally displayed in a partial area of any of four corners in the form of a slave screen, for example. Therefore, since the display itself is relatively small and the display of the virtual image is also shaken with jolting of the vehicle 2, the driver 5 further hardly recognizes the display content visually.

The virtual image related to the monitored video of such an electron mirror is not necessarily superimposed onto the actual view ahead. However, the similar control may be executed for the virtual image that needs to be superimposed to adjust the virtual image by moving display of the virtual image or the display area 6 in the vertical direction or rotating it in the horizontal direction. Note that, in this case, priority of adjustment may be lower for the virtual image that needs to be superimposed onto the actual view ahead.

Further, in the present embodiment, the display state of the virtual image is first adjusted in the display area 6 in the manner of software. In a case where the virtual image cannot be displayed in the display area 6 appropriately because a quantity of jolting is large, it is controlled so as to adjust the display state of the display area 6 itself for the virtual image in the manner of hardware by rotating or moving the mirror 52. However, a reverse control thereof can be executed. Namely, the ECU 21 first adjusts the display area 6 for the virtual image in the manner of hardware by rotating or moving the mirror 52 so that shaking does not occur in the display area 6 itself. Then, in a case where the mirror 52 is adjusted to the maximum but the adjustment is insufficient due to limitation of a movable range that is generated from restriction on structures of the mirror 52 and the mirror driver 50, the ECU 21 may further adjust the display state of the virtual image in the manner of software to complement the insufficiency.

Further, in the above example of the present embodiment, in a case where jolting of the vehicle 2 is detected, the shaking of the display position of the virtual image with respect to the actual view ahead is adjusted. However, a little shaking may be admitted. The ECU 21 may control to execute adjustment of the display state (by restricting the shaking so as not to become the threshold value or more) only in a case of shaking of a predetermined threshold value or more. This is because, depending upon the driver 5, there is a case where the driver 5 may feel normal to experience shaking of the virtual image with which jolting of the vehicle 2 corresponds under a little jolting of the vehicle 2.

<Improvement of Real-Time Property>

By adjusting the virtual image and the display state of the display area 6 in the virtual image by means of the configuration as described above, it is possible to control the virtual image so that jolting does not occur in the display of the virtual image. Here, jolting of the vehicle 2 due to unevenness on a road surface or the like may become a short cycle. In this case, for example, in a case where intended jolting has already been stopped or jolting is changed in a different direction at the time of completion of adjustment of the display state of the virtual image by the method as described above, the adjustment becomes irrelevant. Therefore, a high real-time property is required to immediately handle detected jolting as much as possible.

Thus, in the present embodiment, the ECU 21 does not calculate a moving amount or a rotating amount (a lean) of the display of the virtual image on the basis of values of angles respectively detected by the first and second posture sensors 111 (that is, values indicating jolting of the vehicle 2) each time, but refers to a table to directly determine the moving amount or the rotating amount based on the detected angle, whereby the processing can be simplified. In the present embodiment, a correspondence relationship between various angles in a range in which a given angle can be taken and moving amounts and/or rotating amounts of display of the virtual image is set in advance as a virtual image adjusting amount table, and the virtual image adjusting amount table is held in the nonvolatile memory 23 or the like.

FIG. 29 is a view illustrating an outline of an example of the virtual image adjusting amount table in the head up display according to the present embodiment. Here, FIG. 29 shows a state that a moving amount and a rotating amount of display of the virtual image with respect to detected angles of the first and second posture sensors 111 are respectively set. By referring to this table, it is possible to directly acquire the moving amount or the rotating amount, which corresponds to the angles respectively detected by the first and second posture sensors 111, of the display for the virtual image.

Note that specification and/or a property of the display area 6 in the AR-HUD 1 are different depending upon a type of the AR-HUD 1 and are not defined uniquely. Therefore, the content of this table may be different in accordance with specification or the like of the AR-HUD 1. For example, in the example of the table for the first posture sensor 111 at a left side illustrated in FIG. 29, a moving amount is rounded to ±6 when the angle exceeds ±10. This is because the virtual image protrudes from the display area 6 by moving the virtual image to ±6 or more (and less) in the AR-HUD 1. Therefore, the moving amount is limited to the value or less. Further, the moving amount is set to zero when the angle is smaller than ±5. This indicates that the angle smaller than ±5 is minute and is not detected as shaking (that is, a threshold value to detect jolting of the vehicle 2 is ±5).

The content of the virtual image adjusting amount table may be different depending upon a property of the vehicle 2 on which the AR-HUD 1 is mounted in addition to specification and the like of each AR-HUD 1. For example, the optimum moving amount or the optimum rotating amount may be different depending upon a length or a width of a vehicle body, specification of a suspension, and the like. Therefore, it is desirable that the setting content of the virtual image adjusting amount table has the optimum values that are defined on the basis of the specification of the AR-HUD 1 itself, the specification of the vehicle 2 on which the AR-HUD 1 is mounted, and the like. For example, plural patterns of virtual image adjusting amount tables, in each of which an appropriate default value is set in advance for each typical specification of the vehicle 2, are held for each AR-HUD 1, and one virtual image adjusting amount table to be used may be selected or determined automatically or manually in accordance with specification of the vehicle 2 on which the AR-HUD 1 is actually mounted.

Shift of the display state of the virtual image superimposed onto the actual view ahead and displayed, and an uncomfortable feeling that the driver 5 feels such as the degree of shaking of display may be different depending upon taste of the driver 5. Further, even in a case where the AR-HUD 1 with the same specification is mount on the same vehicle 2, the degree that the driver 5 desires to adjust display of the virtual image with respect to jolting or a lean may be different depending upon a property of a road surface on which the vehicle 2 is often traveling on a daily basis such as traveling to work (whether a ratio of a flat road is large or not, or whether a ratio of a bumpy road is large or not). Further, for example, the degree of shaking or shift of display may change due to circumstances such as a situation that the driver 5 changes a suspension or wheels of the vehicle 2.

Therefore, in the present embodiment, a method in which the driver 5 can set the degree of adjustment of the display state of the virtual image and sensitivity in accordance with taste of the driver 5 is provided. FIG. 30 is a view illustrating an outline of an example in which a degree or sensitivity of adjustment of the display state of the virtual image is allowed to be set in the head up display according to the present embodiment. FIG. 30(*a*) illustrates an example of a menu screen that the AR-HUD 1 displays in the display area 6 in order to receive settings by the driver 5.

Here, for example, it is possible to receive settings to increase or decrease a moving amount when display of the virtual image is moved as an "adjustment amount of display position", and settings to increase or decrease a threshold value of an amount of shaking to execute adjustment of the display state of the virtual image as an "adjustment sensitivity of display position". In the "adjustment amount of display position", for example, by setting "strengthen adjustment" as illustrated in FIG. 30(*a*), it is possible to set the virtual image to be further moved or rotated in a case where the driver 5 feels lack of an adjusting amount of the display state by the AR-HUD 1 with respect to shaking of display of the virtual image against the actual view ahead with jolting of the vehicle 2.

At this time, for example, in the setting content of the virtual image adjusting amount table as illustrated in FIG. 30(*b*), the ECU 21 automatically makes the absolute value of the moving amount of display of the virtual image with respect to the angle detected by the first posture sensor 111 larger by a predetermined value from the original content. A set value of the rotating amount of the virtual image with respect to the angle detected by the second posture sensor 111 is also similar. Note that the table whose setting content is changed is held in the nonvolatile memory 23, but the original setting content before change is also held in the nonvolatile memory 23 at that time. This makes it possible to "restore" the setting content as illustrated in a screen example of FIG. 30(*a*).

Similarly, in the "adjustment sensitivity of display position" of the menu screen illustrated in FIG. 30(*a*), for example, by setting "weaken sensitivity" as illustrated in FIG. 30(*a*), in a case where the driver 5 feels that the display state of the virtual image is not to be adjusted when jolting of the vehicle 2 is little and the virtual image may shape naturally, the threshold value to determine as jolting can be set to be larger, whereby it is possible to set the virtual image so that the display state of the virtual image is not adjusted under little jolting of the vehicle 2. Specifically, in the virtual image adjusting amount table, the angle at which the moving amount or the rotating amount of display of the virtual image is not zero is set to be larger (that is, a range of the angle in which the moving amount or the rotating amount is zero is set to be larger).

Note that as illustrated in the example of the menu screen of FIG. 30(*a*), the method of setting the degree of adjustment or sensitivity by the driver 5 is not limited to simple setting by specifying "strengthen" or "weaken". For example, a detailed setting mode in which the driver 5 can directly set or edit the values of the moving amount and the rotating amount for each angle set in the virtual image adjusting amount table may be provided. Further, results of jolting and/or a lean of the vehicle 2 actually detected by the first and second posture sensors 111 may be accumulated, and the ECU 21 may analyze this to automatically set or recommend the optimum set value.

<Processing Content>

FIG. 31 is a flowchart illustrating an outline of an example of a normal operation executed by the head up display according to the present embodiment. As described above, in the present embodiment, the mirror adjusting process (S24) and the vibration correcting process (S25) in the processing flow for the normal operation illustrated in FIG. 7 according to the first embodiment are improved to become a display state adjusting process (S34). Here, jolting and/or a lean of the vehicle 2 due to unevenness and the like of a road surface on which the vehicle 2 is currently traveling is suppressed by moving and/or rotating the virtual image or the display state of the display area 6 to adjust the virtual image so that the virtual image is appropriately superimposed onto the actual view ahead of the vehicle 2.

On the other hand, the mirror adjusting process (S24) in the processing flow illustrated in FIG. 7 according to the first embodiment is to adjust the display position of the display area 6 with respect to a gradient of the road surface on which the vehicle 2 is currently traveling by taking into consideration a gradient of the road ahead. This may be compatible with the method of adjusting the display state of the virtual image according to the present embodiment. Therefore, the display state adjusting process (S34) may be made by improving the vibration correcting process (S25) while maintaining the mirror adjusting process (S24) in the processing flow illustrated in FIG. 7. Note that the other steps in the processing flow illustrated in FIG. 31 are similar to the corresponding steps in the processing flow illustrated in FIG. 7 according to the first embodiment. Therefore, repeated explanation will be omitted.

FIG. 32 is a flowchart illustrating an outline of an example of a display state adjusting process executed by the head up display according to the present embodiment. When the display state adjusting process is started, the ECU 21 first acquires information on angles detected by the first and second posture sensors 111 on the basis of the vehicle information 4 (S341). The ECU 21 then determines whether a value of each of the angles is caused by jolting of the vehicle 2 (that is, vibration and/or a lean with a short cycle) or not (S342). For example, in a case where a difference between an angle detected at the time of previous processing (or before a fixed time) and an angle detected this time is equal to or more than a predetermined threshold value, it is determined that the value is caused by jolting of the vehicle 2. Namely, in a case where the vehicle 2 itself is inclined for a fixed amount in the front-back direction (the pitch direction) or the horizontal direction (the roll direction) but such a state is continued, it is determined that a state of the vehicle 2 does not change and the vehicle 2 does not jolt.

In a case where any of the angles detected by the first and second posture sensors 111 is not caused by jolting of the vehicle 2 (S342: No), the ECU 21 terminates the display state adjusting process as it is. On the other hand, in a case where at least one is caused by jolting of the vehicle 2 (S342: Yes), the ECU 21 subsequently starts a loop processing to execute a process for each of the first and second posture sensors 111 that detects the angle caused by jolting of the vehicle 2 (S343). In the loop processing, the ECU 21 first refers to the virtual image adjusting amount table held in the nonvolatile memory 23, and acquires a value of the adjusting amount (a moving amount in the vertical direction or a rotating amount in the horizontal direction) of the display state of the virtual image corresponding to the angle detected by the target posture sensor (S344).

The ECU 21 then determines whether the adjusting amount of the display state of the virtual image exceed a predetermined threshold value or not (S345). In the present embodiment, as described above, the ECU 21 first controls to adjust the display state of the virtual image in the display area 6 in the manner of software. In a case where an amount of jolting is large and the virtual image cannot be displayed in the display area 6 appropriately, the ECU 21 controls to adjust the display state of the display area 6 itself for the virtual image in the manner of hardware by rotating and/or moving the mirror 52. Therefore, the ECU 21 herein determines whether the adjusting amount of the virtual image is as large as the virtual image cannot be displayed in the display area 6 appropriately or not. In a case where the adjusting amount of the display state of the virtual image is larger than the predetermined threshold value (S345: Yes), the ECU 21 executes a mirror state adjusting process for adjustment by rotating and/or moving the mirror 52 (S346).

FIG. 33 is a flowchart illustrating an outline of an example of the mirror state adjusting process executed by head up display the according to the present embodiment. The processing content herein is basically similar to the processing content (the processing flow illustrated in FIG. 10) of the mirror adjusting process (S24) in the processing flow illustrated in FIG. 7 according to the first embodiment. Therefore, repeated detailed explanation will be omitted.

In order to move the display area 6 for the virtual image in vertical direction, in the mirror adjusting process (S24) according to the first embodiment, rotates the mirror 52 to a target angle. On the other hand, in the mirror state adjusting process (S346) according to the present embodiment, as illustrated in FIG. 26, the ECU 21 may further move the mirror 52, or rotate the mirror 52 around the z axis to adjust a state of the mirror 52 to a target state by combining these. This makes it possible to move the display state of the display area 6 itself for the virtual image to an appropriate position in the vertical direction or rotate the display state in the horizontal direction.

Returning to FIG. 32, the ECU 21 repeats the series of processes at Steps S344 to S346 described above for each of the first and second posture sensors 111 each of which detects the angle caused by jolting of the vehicle 2, and terminates the loop processing (S347).

The ECU 21 then calculates a display shift amount of the virtual image to be displayed therein (that is, a moving amount and/or a rotating amount with respect to the actual view in front of the vehicle 2) on the basis of the display state of the display area 6 for the virtual image with respect to a current state of the mirror 52 (S348). The ECU 21 executes, in the manner of software processing, adjustment to move the display state of the virtual image in the display area 6 in the vertical direction or rotate the display state in the horizontal direction on the basis of the calculated display shift amount (S349), and terminates the series of display state adjusting process.

As explained above, according to the head up display of the second embodiment of the present invention, it is possible to flexibly suppress shaking of the virtual image with respect to the actual view ahead in various kinds of complicated modes of jolting that the vehicle 2 occurs, and to display the virtual image so as to be superimposed onto an appropriate position. Further, by configuring the head up display to directly acquire the adjusting amount of the display state of the virtual image from the virtual image adjusting amount table on the basis of the angles detected by the first and second posture sensors 111 without calculating it each time, it is possible to maintain a real-time property in the adjustment of the display state of the virtual image, and reduce an uncomfortable feeling given to the driver 5.

As described above, the present invention made by the present inventors has been explained specifically on the basis of the embodiments. However, the present invention is not limited to the embodiments, and it goes without saying that the present invention may be modified into various forms without departing from the substance thereof. For example, the embodiments described above have been explained in detail for explaining the present invention clearly. The present invention is not necessarily limited to one that includes all configurations that have been explained. Further, a part of the configuration of one embodiment can be replaced by a configuration of the other embodiment. Further, a configuration of the other embodiment can be added to a configuration of one embodiment. Moreover, a part of the configuration of each of the embodiments can be added to the other configuration, deleted or replaced thereby.

INDUSTRIAL APPLICABILITY

The present invention is available for a head up display using AR.

REFERENCE SINGS LIST

1 ... AR-HUD, 2 ... vehicle, 3 ... windshield, 4 ... vehicle information, 5 ... driver, 6 display area, 10 ... vehicle information acquiring unit, 20 ... controller, 21 ... ECU, 22 ... audio output unit, 23 ... nonvolatile memory, 24 ... memory, 25 ... light source adjusting unit, 26 distortion correcting unit, 27 ... display element driver, 28 ... display distance adjusting unit, 29 ... mirror adjusting unit, 30 ... video display, 30a ... projector, 30b ... LCD, 31 ... light source, 32 ... illumination optical system, 33 ... display element, 40 ... display distance adjusting mechanism, 41a ... diffuser plate, 41b ... diffuser plate, 41c ... movable diffuser plate, 42a ... lens, 42b ... movable lens, 43a movable optical filter, 43b ... comb-shaped optical filter, 50 ... mirror driver, 51 ... mirror, 51a ... mirror, 51b ... photochromic mirror, 52 ... mirror, 53a to 53c ... mirror driving shafts A to C, 54a ... supporting member, 54b ... mirror holding member, 60 ... speaker, 101 ... vehicle speed sensor, 102 ... shift position sensor, 103 ... handle steering angle sensor, 104 ... headlight sensor, 105 ... illuminance sensor, 106 ... chromaticity sensor, 107 ... distance measuring sensor, 108 ... infrared sensor, 109 ... engine start sensor, 110 ... acceleration sensor, 111 ... posture sensor, 112 ... temperature sensor, 113 ... road-to-vehicle communication wireless receiver, 114 ... vehicle-to-vehicle communication wireless receiver, 115 ... camera (vehicle interior), 116 ... camera (vehicle exterior), 117 ... GPS receiver, 118 ... VICS receiver, 281 ... functional liquid crystal film ON/OFF controller, 282 ... lens moving unit, 283 ... photochromic mirror ON/OFF controller, 284 ... diffuser plate moving unit, 285 ... optical filter moving unit, 401 ... functional liquid crystal film, 402 ... lens moving mechanism, 403 ... photochromic mirror, 404 ... diffuser plate moving mechanism, 405 ... optical filter moving mechanism

The invention claimed is:

1. A head up display for a vehicle, comprising:
a vehicle information acquiring unit configured to acquire vehicle information containing a lean of the vehicle in a pitch direction, which is detected by a first posture sensor, and a lean in a roll direction, which is detected by a second posture sensor, the first and second posture sensors being mounted on the vehicle;
a controller configured to control display of video on a basis of the vehicle information acquired by the vehicle information acquiring unit;
a video display configured to form the video in accordance with an instruction from the controller;
a mirror configured to reflect the video formed by the video display to project the video directly on to a windshield having a curvature; and
a mirror driver configured to change an angle and/or a position of the mirror on a basis of an instruction from the controller,
wherein the controller is configured to adjust at least one of a display state of a virtual image in a display area for the video or the angle and/or the position of the mirror via the mirror driver on a basis of the lean in the pitch direction and/or the lean in the roll direction in the vehicle information so that the virtual image is superimposed onto a scene and the virtual image can be displayed to a driver,
wherein the controller is further configured to control display of the video to correct for distortion which occurs due to the curvature of the windshield,
wherein in a case where the display state of the virtual image is adjusted and an adjusting amount is smaller than a predetermined value, the controller is configured to adjust the display state of the virtual image in the display area for the video on the basis of the lean in the pitch direction and/or the lean in the roll direction in the vehicle information, and
wherein in a case where an adjusting amount is equal to or more than a predetermined value, the controller is configured to adjust the angle and/or the position of the mirror via the mirror driver on the basis of the lean in the pitch direction and/or the lean in the roll direction in the vehicle information, and further adjust the display state of the virtual image in the display area for the video.

2. The head up display according to claim 1, wherein the controller is configured to restrict, in a case where the display state of the virtual image is adjusted and the virtual image goes out from the display area, the adjustment to a state where at least a part of the virtual image is displayed at an end portion of the display area.

3. The head up display according to claim 1, wherein a table is held in a nonvolatile memory, settings of a moving amount of the virtual image in a vertical direction with respect to each value of the lean in the pitch direction and settings of a rotating amount of the virtual image in a horizontal direction with respect to each value of the lean in the roll direction in the vehicle information being held in the table, and
wherein the controller is configured to acquire corresponding values of the moving amount of the virtual image in the vertical direction and/or the rotating amount of the virtual image in the horizontal direction from the table on the basis of the lean in the pitch direction and/or the lean in the roll direction in the vehicle information.

4. The head up display according to claim 3, wherein in the table, each of the values of the moving amount of the virtual image in the vertical direction and/or the rotating amount of the virtual image in the horizontal direction is set to zero in a range in which each of absolute values of the lean in the pitch direction and/or the lean in the roll direction is smaller than a predetermined value.

5. The head up display according to claim 3, wherein the controller is configured to calculate information related to the settings of the table on a basis of a past performance of the vehicle information, and update content of the table.

6. A head up display for a vehicle, comprising:
a vehicle information acquiring unit configured to acquire vehicle information containing a lean of the vehicle in a pitch direction, which is detected by a first posture sensor, and a lean in a roll direction, which is detected by a second posture sensor, the first and second posture sensors being mounted on the vehicle;
a controller configured to control display of video on a basis of the vehicle information acquired by the vehicle information acquiring unit;

a video display configured to form the video in accordance with an instruction from the controller;

a mirror configured to reflect the video formed by the video display to project the video to a windshield or combiner; and a mirror driver configured to change an angle and/or a position of the mirror on a basis of an instruction from the controller, wherein the controller is configured to adjust at least one of a display state of a virtual image in a display area for the video or the angle and/or the position of the mirror via the mirror driver on a basis of the lean in the pitch direction and/or the lean in the roll direction in the vehicle information so that the virtual image is superimposed onto a scene and the virtual image can be displayed to a driver, wherein in a case where the display state of the virtual image is adjusted and an adjusting amount is smaller than a predetermined value, the controller is configured to adjust the display state of the virtual image in the display area for the video on the basis of the lean in the pitch direction and/or the lean in the roll direction in the vehicle information, and in a case where an adjusting amount is equal to or more than a predetermined value, the controller is configured to adjust the angle and/or the position of the mirror via the mirror driver on the basis of the lean in the pitch direction and/or the lean in the roll direction in the vehicle information, and further adjust the display state of the virtual image in the display area for the video.

\* \* \* \* \*